United States Patent
Bertino

(10) Patent No.: US 10,414,894 B2
(45) Date of Patent: Sep. 17, 2019

(54) METHOD FOR ONE-STEP SYNTHESIS, CROSS-LINKING AND DRYING OF AEROGELS

(71) Applicant: Virginia Commonwealth University, Richmond, VA (US)

(72) Inventor: Massimo Bertino, Glen Allen, VA (US)

(73) Assignee: Virginia Commonwealth University, Richmond, VA (US)

( * ) Notice: Subject to any disclaimer, the term of this patent is extended or adjusted under 35 U.S.C. 154(b) by 26 days.

(21) Appl. No.: 15/500,376

(22) PCT Filed: Jul. 31, 2015

(86) PCT No.: PCT/US2015/043234
§ 371 (c)(1),
(2) Date: Jan. 30, 2017

(87) PCT Pub. No.: WO2016/019308
PCT Pub. Date: Feb. 4, 2016

(65) Prior Publication Data
US 2017/0218160 A1 Aug. 3, 2017

Related U.S. Application Data

(60) Provisional application No. 62/031,211, filed on Jul. 31, 2014.

(51) Int. Cl.
| | | |
|---|---|---|
| C08J 9/28 | (2006.01) | |
| B01J 3/00 | (2006.01) | |
| C01B 33/158 | (2006.01) | |
| B01J 13/00 | (2006.01) | |
| C08L 33/08 | (2006.01) | |

(52) U.S. Cl.
CPC .......... *C08J 9/28* (2013.01); *B01J 13/0091* (2013.01); *C01B 33/1585* (2013.01); *C08J 9/286* (2013.01); *C08J 2201/022* (2013.01); *C08J 2201/026* (2013.01); *C08J 2201/0522* (2013.01); *C08J 2201/0524* (2013.01); *C08J 2205/026* (2013.01); *C08J 2205/042* (2013.01); *C08J 2333/08* (2013.01); *C08J 2383/06* (2013.01); *C08L 33/08* (2013.01); *Y02P 20/544* (2015.11)

(58) Field of Classification Search
CPC ..... B01J 13/0091; C01B 33/1585; C08J 9/28; C08J 9/286; C08J 2201/022; C08J 2201/026; C08J 2201/0522; C08J 2201/0524; C08J 2205/026; C08J 2205/042; C08J 2333/08; C08J 2383/06; C08L 33/08; Y02P 20/544
See application file for complete search history.

(56) References Cited

U.S. PATENT DOCUMENTS

| | | |
|---|---|---|
| 3,271,299 A | 9/1966 | Kearby |
| 7,384,988 B2 | 6/2008 | Gauthier et al. |
| 8,227,363 B2 | 7/2012 | Leventis et al. |
| 2004/0132846 A1 | 7/2004 | Leventis et al. |
| 2011/0245359 A1 | 10/2011 | Condo et al. |
| 2011/0250428 A1 | 10/2011 | Leventis et al. |
| 2013/0131203 A1 | 5/2013 | Chaput et al. |
| 2014/0065229 A1 | 3/2014 | Giray et al. |

OTHER PUBLICATIONS

A. B. Meador, C. M. Scherzer, S. L. Vivod, D. Quade, B. N. Nguyen, "Epoxy Reinforced Aerogels Made Using a Streamlined Process", ACS Appl. Mater. Interfaces 2010, 2, 2162.
Al-Yassir, R. Le Van Mao, "Evaluating and understanding the hydrothermal stability of alumina aerogel doped with yttrium oxide and used as a catalyst support for the thermo-catalytic cracking (TCC) process", Can. J. Chemistry 2008, 86, 146.
Burget, C. Mallein, J. P. Fouassier, "Photopolymerization of thiol-allyl ether and thiol-acrylate coatings with visible light photosensitive systems", Polymer 2004, 45, 6561.
C. Pierre, G. M. Pajonk, "Chemistry of aerogels and their applications", Chem. Rev., 2002, 102, 4243.
Chhor, J. F. Bocquet, C. Pommier, "Syntheses of submicron TiO2 powders in vapor, liquid and supercritical phases, a comparative study", Mater. Chem. Phys. 1992, 32, 249.
Y. Duan, S. C. Lana, B. Lama, M. P. Espe, "Reinforcement of Silica Aerogels Using Silane-End-Capped Polyurethanes", Langmuir 2013, 29, 6156.
Douglas A. Loy et al., "Direct Formation of Aerogels by Sol-Gel Polymerizations of Alkoxysilanes in Supercritical Carbon Dioxide", Chem. Mater. 1997, 9, 2264-2268.
Fouassier et al, "Dyes as Photoinitiators or Photosensitizers of Polymerization Reactions", Materials 2010, 3, 5130-5142.
Gross, P. R. Coronado, L. W. Hrubesh, "Elastic properties of silica aerogels from a new rapid supercritical extraction process", J. Non-Cryst. Solids 1998, 225, 282.
He, H. Zhao, X. Qu, C. Zhang, W. Qiu, "Modified aging process for silica aerogel", J. Mater. Process Tech. 2009,209, 1621.
International Application No. PCT/US2015/043234, International Search Report and Written Opinion dated Nov. 3, 2015, 9 pages.

(Continued)

*Primary Examiner* — Irina S Zemel
(74) *Attorney, Agent, or Firm* — New River Valley IP Law, P.C.; Michele L. Mayberry

(57) ABSTRACT

A method of synthesizing aerogels and cross-linked aerogels in a single step and in a single pot without requiring any solvent exchange is described. Porous matrices are synthesized through a modification of hydrolysis condensation of alkoxides in which addition of water is minimized. The reaction occurs in an ethanol-water azeotrope mixture; the water in the azeotrope slowly hydrolyzes the alkoxide. Additionally, after gelation, the porous matrix is dried in supercritical ethanol rather than liquid $CO_2$, which allows for elimination of solvent exchange steps. These modifications allow for the preparation of aerogel monoliths in any size in one step and in one pot and much faster than conventional procedures. In addition, the method provides for custom aerogel parts with large dimensions, as well as high volume fabrication of aerogels. The custom aerogel parts may be used in a variety of thermal insulation applications.

16 Claims, 17 Drawing Sheets

(56) References Cited

OTHER PUBLICATIONS

J. Avens, C. N. Bowman, "Mechanism of Cyclic Dye Regeneration During Eosin-Sensitized Photoinitiation in the Presence of Polymerization Inhibitors", J. of Polymer Sci. 2009,47,6083.

J. Brinker, K. D. Keefer, D. W. Schaefer, C. S. Ashley, "Sol-gel transition in simple silicates", J. Non-Cryst. Solids 1982, 48, 47.

Katti, N. Shimpi, S. Roy, H. Lu, E. F. Fabrizio, A. Dass, L A. Capadona, N. Leventis, "Chemical, physical, and mechanical characterization of isocyanate cross-linked amine-modified silica aerogels", Chem. Mater. 2005, 18, 285.

L. Kocon, F. Despetis, J. Phalippou, "Ultralow density silica aerogels by alcohol supercritical drying", J. Non-Cryst. Solids 1998, 225, 96.

LJ Mathias, B. S. Shemper, M. Alirol, J.F. Morizur, "Synthesis of New Hydroxylated Monomers Based on Methacrylate, Dimethacrylate, and Tetramethacrylate Michael Adducts and Photopolymerization Kinetics of Bulk Cross-Linkers", Macromolecules 2004, 37, 3231.

M. A. B. Meador, L. A. Capadona, L. McCorkle, D. S. Papadopoulos, N. Leventis, "Structure-Property Relationships in Porous 3D Nanostructures as a Function of Preparation Conditions: Isocyanate Cross-Linked Silica Aerogels", Chem. Mater. 2007, 19, 2247.

M. Anderson, C. W. Wattley, M. K. Carroll, "Silica aerogels prepared via rapid supercritical extraction: effect of process variables on aerogel properties", J. Non-Cryst. Solids 2009, 355, 101.

M. Pajonk, A. V. Rao, B. M. Sawant, N. N. Parvathy, "Dependence of monolithicity and physical properties of TMOS silica aerogels on gel aging and drying conditions", J. Non-Cryst. Solids 1997, 209, 40.

Reichenauer, "Thermal aging of silica gels in water", J. Non-Cryst. Solids 2004, 350, 189.

Rigacci, M.A Einarsrud, E. Nilsen, R. Pirard, F. E Dolle, B. Chevalier, "Improvement of the silica aerogel strengthening process for scaling-up monolithic tile production", J. Non-Cryst. Solids 2004, 350, 196.

S. S. Kistler, "Coherent Expanded Aerogels and Jellies", Nature 127, 3211 (1931.).

S. Yoda, S. Ohshima, "Supercritical drying media modification for silica aerogel preparation", J. Non-Cryst. Solids 1999, 248, 224.

Wingfield, A. Baski, M. F. Bertin, N. Leventis, D. P. Mohite, and H. Lu, "Fabrication of Sol-Gel Materials with Anisotropic Physical Properties by Photo-Cross-Linking", Chem. Mater., 2009, 21, 2108.

Wingfield, L. Franzel, M. F. Bertino, N. Leventis, "Fabrication of functionally graded aerogels, cellular aerogels and anisotropic ceramics", J. Mater. Chem., 2011, 21, 11737.

A. Bazaev, A R. Bazaev, A. A. Abdurashidova, "An experimental investigation of the critical state of aqueous solutions of aliphatic alcohols", High Temp. 2009, 47, 195.

E. Walrafen, M. S. Hokmabadi, N. C. Holmes, W. J. Nellis, S. Henning, "Raman spectrum and structure of silica aerogel", J. Chem. Phys. 1985, 82, 2472.

G Lovell, C. N. Bowman, "The effect of kinetic chain length on the mechanical relaxation of crosslinked photopolymers", Polymer 2003, 44, 39.

J. Brinker, "Hydrolysis and condensation of silicates: Effects on structure", J. Non-Cryst. Solids,1988, 100, 31.

K. G. Sharp, "A two-component, non-aqueous route to silica gel", J. Sol-Gel Sci. Techn. 1994, 2, 35.

L. Safranski, K. Gall, "Effect of chemical structure and crosslinking density on the thermo-mechanical properties and toughness of (meth)acrylate shape memory polymer networks", Polymer 2008, 49, 4446.

M. Schneider, A. Baiker, "Aerogels in Catalysis", Catal Rev. 1995, 37, 515.

N. B. Cramer, C. N. Bowman, "Kinetics of thiol—ene and thiol—acrylate photopolymerizations with real-time fourier transform infrared", Journal of Polymer Science Part A: Polymer Chemistry, 2001, 39, 3311.

N. Leventis, "Three-Dimensional Core-Shell Superstructures: Mechanically Strong Aerogels", Accounts Chem. Res. 2007, 40, 874.

Phalippou, T. Woignier, M. Prassas, "Glasses from aerogels—Part 1 The synthesis of monolithic silica aerogels", J. Mater. Sci. 1990, 25, 3111.

S. E. Friberg, J. Yang, A. Amran, 1. Sjablom, G. Farrington, "Reaction between Copper Nitrate Hydrate and Tetraethoxysilane in Methanol. A 29Si NMR Investigation", J. Phys. Chem. 1994, 98, 13528.

S. S. Kistler, "Coherent Expanded-Aerogels", J. Phys. Chem., 1932, 36 (1), pp. 52-64.

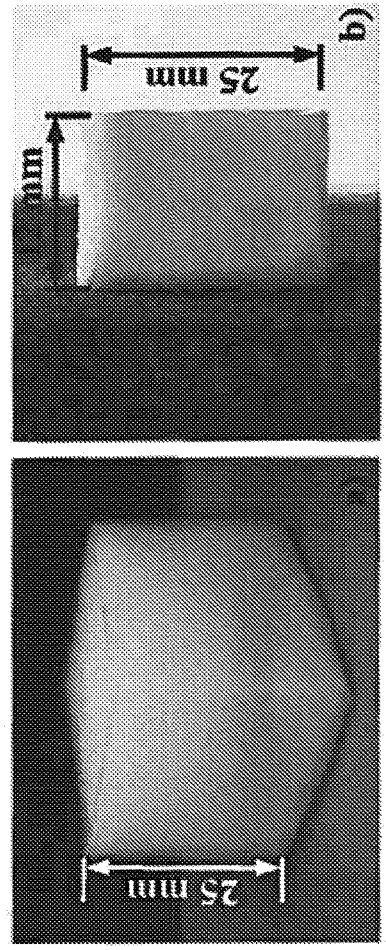
FIG. 11A
FIG. 11B
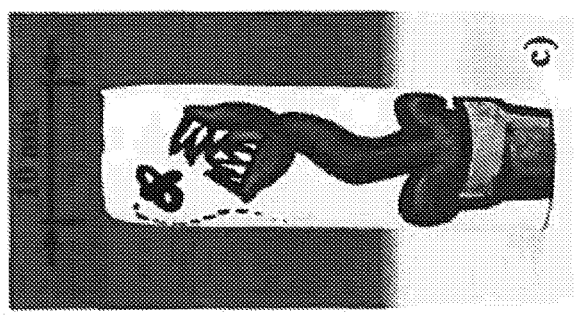
FIG. 11C
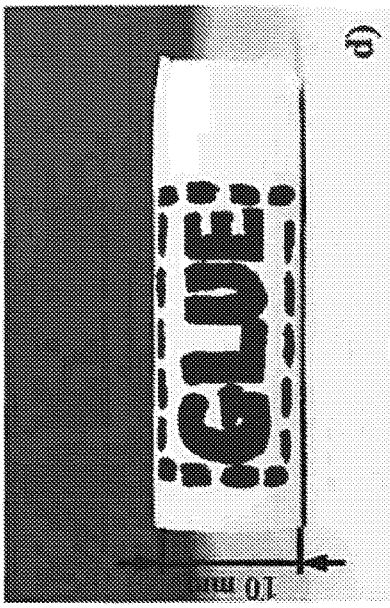
FIG. 11D

Section A-A

US 10,414,894 B2

METHOD FOR ONE-STEP SYNTHESIS, CROSS-LINKING AND DRYING OF AEROGELS

CROSS-REFERENCE TO RELATED APPLICATIONS

The present application is a National Stage application under 35 USC § 371 of International Application No. PCT/US15/43234, filed Jul. 31, 2015, which application relies on the disclosure of and claims priority to and the benefit of the filing date of U.S. Provisional Application No. 62/031,211, filed Jul. 31, 2014, the disclosures of each of which are hereby incorporated by reference herein in their entireties.

BACKGROUND OF THE INVENTION

Field of the Invention

The present invention relates to the field of aerogel synthetic chemistry. More particularly, the present invention in embodiments relates to a one-step method for producing an aerogel which does not require solvent exchange.

Description of Related Art

Aerogels are solid materials of extremely low density, produced by removing the liquid component from a conventional wet gel. They are ultra-light, highly porous and highly thermally insulating materials composed of a network of interconnected nanostructures. Their typical density is lower than 0.1 g/cm$^3$, their surface area is in the 700-1000 m2/g range and their thermal conductivity can be as low as 2.1 mW/mK (see N. Leventis, *Accounts of Chemical Research.*, 2007, 40, 874 ("Leventis, 2007") and A. C. Pierre, G. M. Pajonk, *Chem. Rev.*, 2002, 102, 4243 ("Pierre, 2002")). Because of this unique combination of properties, aerogels are being considered for applications as varied as thermal and sound insulation for the aerospace industry, as absorbents for environmental remediation and as catalyst supports. However, aerogels are also mechanically fragile and their use has been limited to niche applications such as thermal insulation for the Mars Rovers, as collectors of space and comet dust and as Cerenkov detectors (see Leventis, 2007 and Pierre, 2002). By way of background, other efforts in this area include those described by Leventis et al., such as in U.S. Pat. No. 8,227,363 and in U.S. Patent Application No. 2011/0250428 A1, hereby incorporated by reference in their entireties.

Aerogels are fabricated starting from wet gels. Wet gels are porous materials with the same porosity and surface area of aerogels. However, the pores of wet gels are filled with solvent and precursors used for the synthesis. Typically, the solvent is some alcohol (methanol, ethanol, propanol) and some water is added to catalyze the synthetic reaction. The solvent cannot be evaporated without cracking the gel because of capillary forces. That is, the solvent adheres strongly to the pore walls and induces cracks and pore collapse when it evaporates. To prevent cracking, a fluid with a low (ideally zero) surface tension is employed, which minimizes the capillary forces. This solvent is typically a supercritical solvent. For example, a method described in U.S. Pat. No. 7,384,988 to Anderson (incorporated by reference herein in its entirety) provides for preparation of aerogels using rapid supercritical extraction (RSCE) using a mold to contain gelation solution under a desired pressure and temperature in order to form the aerogel, then excess solvent (supercritical alcohol) escapes through gaps in the mold or through a relief valve. For a series of technical reasons (low supercritical pressure and temperature, low cost, low toxicity, low flammability), supercritical CO2 is the most popular choice. For supercritical drying, a wet gel is placed into liquid CO2, which replaces the solvent when it diffuses inside the pores. The vessel containing the liquid CO2 is then heated, the liquid CO2 becomes supercritical and crack-free aerogel monoliths are produced.

Drying in supercritical CO2, however, presents several disadvantages. In the first place, water is not soluble in liquid CO2, thus, CO2 will not diffuse inside the pores if water is present. This requires exchange of the solvents used in the gel synthesis with a water free solvent, the most popular choice being acetone. For example, Douglas A. Loy et al., Direct Formation of Aerogels by Sol-Gel Polymerizations of Alkoxysilanes in Supercritical Carbon Dioxide, Chem. Mater. 1997, 9, 2264-2268 (incorporated by reference herein in its entirety), addresses this by eliminating the organic (alcohol) solvent altogether. Furthermore, solvent exchange is an extremely time-consuming process. Depending on the size of the gel, it may take several days, and require a volume of fresh solvent 5-10 times larger than the volume of the gel. In addition, the time required for solvent exchange scales roughly with the square of the dimensions of the gel. For gels with dimensions larger than about 1 inch, the time required for exchange can be of almost one week. Because of this, industrial manufacturers of aerogels produce parts with one linear dimension of a few millimeters to limit the exchange times to a few hours. When considering diffusion times, one must also consider the time required for diffusion of liquid CO2. For large parts, this time can also be of days, and forces one to keep the drying vessel refrigerated and at high pressures (~800 psi) for days in a row, quite an impractical proposition. Given these limitations, there is a need in the art for improved processes for producing aerogels.

SUMMARY OF THE INVENTION

The present invention provides methods for producing and cross-linking aerogels in a single step and in a single pot without requiring any solvent exchange. In one embodiment, the method comprises mixing a first solution comprising an alkoxide and a second solution comprising a catalyst and optionally pouring the mixed solutions into a mold, wherein such mixing step results in formation of a wet gel as a result of precursor reaction such as hydrolysis of the alkoxide and polymerization of the hydrolyzed alkoxide, and drying the wet gel in an ethanol-water azeotrope mixture or an organic solvent or a mixture of solvent with supercritical temperature and pressure comparable to that of the solvent used for gelation heated at supercritical temperature and pressure to form an aerogel.

In another embodiment, the method comprises mixing a first solution comprising an alkoxide, a photoinitiator, or a thermal initiator and a first monomer, such as an acrylic monomer, and a second solution comprising a catalyst and optionally a second acrylic monomer and optionally pouring the mixed solutions into a mold, wherein such mixing step results in the formation of a wet gel as a result of hydrolysis of the alkoxide and polymerization of the hydrolyzed alkoxide, exposing the wet gel to a source of visible light or ultraviolet light or heat with sufficient intensity to catalyze cross-linking of the wet gel, drying the wet gel in an ethanol-water azeotrope mixture or other solvent mixture as described above heated at supercritical temperature and pressure to form a cross-linked aerogel.

In embodiments of the invention, the first solution and second solution comprise an ethanol-water azeotrope mixture, or any mixture of water and an organic solvent that is a supercritical fluid. Further, only water in the ethanol-water azeotrope mixture catalyzes the hydrolysis of the alkoxide. The first solution and second solution may contain no water beyond that contained in the ethanol-water azeotrope mixture. As a result, the method requires no solvent exchange step as the wet gel is not dried in liquid or supercritical $CO_2$. Optionally, precursors can be used that can react to liberate water during gelation or heating.

Additional embodiments of the invention and their details will be provided in the foregoing Detailed Description.

BRIEF DESCRIPTION OF THE DRAWINGS

The accompanying drawings illustrate certain aspects of embodiments of the present invention, and should not be used to limit the invention. Together with the written description the drawings serve to explain certain principles of the invention.

FIGS. 11A-11D are photographs showing examples of aerogel monoliths produced with the technique of EXAMPLE 1. FIG. 11A: native oxide aerogel monolith in the shape of a cube with a size 25 mm using the acid catalyzed synthesis method. FIG. 11B: A crosslinked monolith glued to a concrete block. FIGS. 11C and 11D: Cross-linked aerogels synthesized by art students without prior training and decorated with acrylic paint.

FIG. 15A: a native aerogel layer (white) is sandwiched between two polymer-reinforced aerogel layers (brown) which confer mechanical stability. FIG. 15B: the sole is joined with a custom-molded toe insulation.

DETAILED DESCRIPTION OF VARIOUS EMBODIMENTS OF THE INVENTION

Figure 1A:
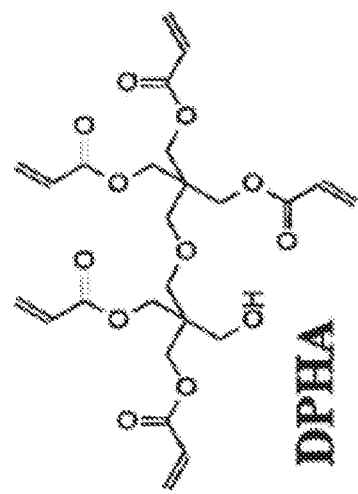
FIG. 1A is the structural formula for acrylated dipentaerythritol (DPHA).

Reference will now be made in detail to various exemplary embodiments of the invention. It is to be understood that the following discussion of exemplary embodiments is not intended as a limitation on the invention. Rather, the following discussion is provided to give the reader a more detailed understanding of certain aspects and features of the invention.

In embodiments, the present invention provides a method of synthesizing aerogels and cross-linked aerogels in a single step and in a single pot without requiring any solvent exchange. In addition, embodiments of the invention allow for fabrication of custom aerogel parts with large dimensions, as well as high volume fabrication of aerogels. The custom aerogel parts may be used in a variety of thermal insulation applications.

In particular, the present invention in embodiments provides a method in which a porous monolith is synthesized, made mechanically robust by polymer cross-linking and dried supercritically into an aerogel in one step and in one pot, without requiring any intermediate processing steps and/or solvent exchange.

In embodiments of the method, porous matrices are synthesized through a modification of hydrolysis condensation of alkoxides in which addition of water is reduced, or minimized. The reaction occurs in an organic solvent and water with a concentration of water of approximately 4.4% v/v or lower, such as an ethanol-water azeotrope mixture (as used in this specification, references to "ethanol" are intended to mean an ethanol-water azeotrope mixture); the water in the azeotrope slowly hydrolyzes the alkoxide. Lower water concentrations can also be employed but they usually increase gelation time. In embodiments, water can be present in the gelation solution in an amount ranging from about 0.05% v/v to about 5% v/v, such as from 0.1% v/v to 4% v/v, or from about 0.2% v/v to 3% v/v, or from 0.3% v/v to 2% v/v, or from 0.4% v/v to 1.5% v/v, or from about 0.5% v/v to 1% v/v, or from about 0.6% v/v to 0.8% v/v. Water can also be provided by adding to the gelation solution hydrated metal salts. Instead of water, a compound that reacts with the alkoxide or dissociates at high temperature and liberates water could be used, such as formic acid. In embodiments, any mixture of water and an organic solvent that is a supercritical fluid can be used. For example, a mixture of acetone and water, or alcohol and water, or methanol and water, or butanol and water, or propanol and water can be used, which all become supercritical fluids once brought to the appropriate temperatures and pressures. A supercritical mixture of dimethylsulfoxide and water, or a ketone and water can be used. Combinations of any of these mixtures can also be used so long as the resultant combination is a supercritical fluid.

Additionally, after gelation, the porous matrix (or aerogel) is dried in a supercritical fluid, such as supercritical ethanol, rather than liquid $CO_2$, which allows for elimination of solvent exchange steps. Thus, the organic solvent and water azeotrope mixture (e.g., ethanol-azeotrope mixture) serves as both gelation solvent and supercritical drying fluid. These modifications allow for the preparation of aerogel monoliths in any size in one step and in one pot and much faster than conventional procedures.

In embodiments, a method for producing an aerogel is provided, the method comprising: (a) providing a first solution comprising an alkoxide; (b) providing a second solution comprising a catalyst; (c) mixing the first and second solutions to provide a gelation mixture; (d) optionally pouring the solutions (or gelation mixture) into a mold; wherein the mixing of the first and second solutions results in formation of a wet gel as a result of hydrolysis of the alkoxide and polymerization of the hydrolyzed alkoxide; and (e) after gelation, drying the wet gel in an organic solvent and water azeotrope mixture heated at supercritical temperature and pressure to form an aerogel, where the drying is performed with the wet gel outside of any mold. Although a mold for preparing custom shapes can be used during gelation, or no mold at all, an advantage of preparation of the disclosed aerogels is that drying can be performed without a mold, i.e., no mold is required during either gelation, drying, or both.

In embodiments, the alkoxide may be a silicon alkoxide such as the organo-orthosilicates TEOS and TMOS. Alkoxides of other transition metals, as well as chlorides, nitrates or acetylacetonates can also be employed. In embodiments, for example, sodium silicate and/or aluminum chloride could be used in particular. Although silica may be used, any metal oxide and sulfide can also or alternatively be used.

The reaction may be catalyzed by an acid (such as a metal salt) or base (such as an amine) or a catalyst containing fluoride. To minimize the amount of water added to the solution, a metal salt may be added as an acid catalyst. In one embodiment, aluminum chloride is used. In other embodiments, salts containing other acidic ions including $Cr^{3+}$, $Fe^{3+}$ $Bi^{3+}$, $Be^{2+}$, $NH_4^+$ are used. In other embodiments, acids such as hydrochloric acid, sulfuric acid, and nitric acid are used. Base catalysts may include amines such as triethanolamine, diethanolmethylamine, dimethylethylamine, or dimethanolmethylamine or hydroxides such as ammonium hydroxide. Other embodiments may use ammonium fluoride.

Additionally, embodiments may employ an acrylate or acrylated monomer for the synthesis of cross-linked aerogels, and the cross-linking reaction may be catalyzed by photopolymerization. Examples of acrylated monomers include HDDA and acrylated DPHA.

Photopolymerization of cross-linked aerogels may be initiated by including a photoinitiator in one of the precursor solutions. Examples of photoinitiators include Eosin Y, Nile Red, Alizarine Red S, and Rhodamine B. Other examples of photoinitiators are known (see Fouassier et al, Dyes as Photoinitiators or Photosensitizers of Polymerization Reactions, *Materials* 2010, 3, 5130-5142). Polymerization can be also induced thermally or by using thermal initiators.

The aerogels may be produced in molds having a variety of shapes suitable for thermal insulation applications, examples of which are shown in FIGS. 13A-15B. As the aerogels may be manufactured as monoliths with a volume of up to 100 cm$^3$, the gels may be cast into a variety of shapes suitable for a variety of applications.

Specific embodiments of the method of the invention will be described below to further illustrate the invention.

In one specific embodiment of the method, porous matrices are synthesized by hydrolyzing an alkoxide without adding any water beyond that present in the ethanol-water azeotrope. First TMOS is dissolved into ethanol. Separately, a second solution is prepared which contains ethanol and an amine such as triethanolamine. The two solutions are then mixed and poured into a mold and a gel forms typically within about an hour. The gel is then removed from the mold and dried in supercritical ethanol (such as in an autoclave) to yield a porous material (aerogel). The ethanol used in the procedure may be an ethanol-water mixture which contains no more than 4.4% water by volume. Additionally, a base or acid is added during the hydrolysis step as a catalyst. Additional processing steps include a curing step performed overnight. The drying step may take 1-10 hours, depending on autoclave size. In specific embodiments of the procedure, the first solution may comprise a ratio of TMOS to ethanol at about 1:99 to 99:1, such as from 2:98 to 98:2, or from 3:97 to 97:3, or from 5:95 to 95:5, or from 10:90 to 90:10, or from 20:80 to 80:10, or from 30:70 to 70:30, or from 40:60 to 60:40, or 50:50, or any range within these ratio ranges. The second solution may comprise a ratio of triethanolamine to ethanol at about 1:99 to 99:1, such as from 2:98 to 98:2, or from 3:97 to 97:3, or from 5:95 to 95:5, or from 10:90 to 90:10, or from 20:80 to 80:10, or from 30:70 to 70:30, or from 40:60 to 60:40, or 50:50, or any range within these ratio ranges. The ratio of triethanolamine to TMOS may be around 1:99 to 99:1 as well, such as from 2:98 to 98:2, or from 3:97 to 97:3, or from 5:95 to 95:5, or from 10:90 to 90:10, or from 20:80 to 80:10, or from 30:70 to 70:30, or from 40:60 to 60:40, or 50:50, 1:2, 2:1, 1:3, 3:1, 1:4, 4:1, 1:5, 5:1, 1:6, 6:1, 1:10 or 10:1 and so on, or any range within these ratio ranges. After gelation, the aerogel may be dried in supercritical ethanol at about 513 K, 60.6 atmospheres.

In embodiments, the first and second solutions are combined to provide a gelation mixture and the alkoxide is present in an amount ranging from about 0.1% v/v to 50% v/v based on total volume of the gelation mixture, and/or the gelation mixture comprises an amine present in an amount ranging from about 0.1% v/v to 20% v/v based on total volume of the gelation mixture, and/or the gelation mixture comprises a supercritical organic solvent present in an amount ranging from about 20% v/v to 90% v/v based on total volume of the gelation mixture. In embodiments, the organic solvent can be present in these concentrations and can be chosen from one or more of an alcohol or a ketone, such as one or more of ethanol, methanol, butanol, propanol, acetone, or dimethylsulfoxide.

Another specific embodiment of the method provides for the synthesis of aerogel composites. A first solution is prepared by adding an alkoxide carrying a polymerizable moiety (such as vinyltrimethoxysilane (VMOS)) to a solution of ethanol and TMOS. A second solution is prepared separately which contains ethanol, triethanolamine, a polymerization initiator and a monomer such as methylacrylate. The solutions are then mixed and a gel is synthesized by mixing the two solutions. The gel is then dried for supercritical drying in an autoclave. In alternative embodiments, the gel may be polymerized before the drying step through thermal initiation or photopolymerization. In specific embodiments of the procedure, the first solution may comprise a ratio of VMOS to ethanol at about 1:99 to 99:1, such as from 2:98 to 98:2, or from 3:97 to 97:3, or from 5:95 to 95:5, or from 10:90 to 90:10, or from 20:80 to 80:10, or from 30:70 to 70:30, or from 40:60 to 60:40, or 50:50, or any range within these ratio ranges. The ratio of TMOS to ethanol may be at about 1:99 to 99:1 as well, such as from 2:98 to 98:2, or from 3:97 to 97:3, or from 5:95 to 95:5, or from 10:90 to 90:10, or from 20:80 to 80:10, or from 30:70 to 70:30, or from 40:60 to 60:40, or 50:50, or any range within these ratio ranges. The second solution may comprise a ratio of triethanolamine to ethanol at about 1:99 to 99:1, such as from 2:98 to 98:2, or from 3:97 to 97:3, or from 5:95 to 95:5, or from 10:90 to 90:10, or from 20:80 to 80:10, or from 30:70 to 70:30, or from 40:60 to 60:40, or 50:50, or any range within these ratio ranges. The second solution may comprise a ratio of monomer to ethanol of 1:99 to 99:1, such as from 2:98 to 98:2, or from 3:97 to 97:3, or from 5:95 to 95:5, or from 10:90 to 90:10, or from 20:80 to 80:10, or from 30:70 to 70:30, or from 40:60 to 60:40, or 50:50, or any range within these ratio ranges. Likewise, the ratio of triethanolamine to TMOS may be around 1:99 to 99:1, such as from 2:98 to 98:2, or from 3:97 to 97:3, or from 5:95 to 95:5, or from 10:90 to 90:10, or from 20:80 to 80:10, or from 30:70 to 70:30, or from 40:60 to 60:40, or 50:50, 1:2, 2:1, 1:3, 3:1, 1:4, 4:1, 1:5, 5:1, 1:6, 6:1, 1:10 or 10:1 and so on, or any range within these ratio ranges. The ratio of triethanolamine to VMOS may be around 1:99 to 99:1 as well, such as from 2:98 to 98:2, or from 3:97 to 97:3, or from 5:95 to 95:5, or from 10:90 to 90:10, or from 20:80 to 80:10, or from 30:70 to 70:30, or from 40:60 to 60:40, or 50:50, 1:2, 2:1, 1:3, 3:1, 1:4, 4:1, 1:5, 5:1, 1:6, 6:1, 1:10 or 10:1 and so on, or any range within these ratio ranges.

Another specific embodiment of the method, which uses a base catalyst, is described in EXAMPLE 1. Briefly, a first ethanolic solution containing TMOS is added to a second ethanolic solution containing diethanolmethylamine and poured into molds. The final TMOS concentration of the mixed solution ranges at a volume fraction between 6% and 25%. Lower volume fractions produce low density gels, while higher volume fractions result in high density gels. The base (diethanolamine) is added to catalyze the reaction. Gelation may occur within 30 minutes.

Another specific embodiment of the method, which uses an acid catalyst for the synthesis of silica aerogels, is described in EXAMPLE 1. Briefly, a first solution is prepared by adding Tetraethyl Orthosilicate (TEOS) to a metal salt solution such as aluminum chloride in a volume fraction between 6.6% and 25% v/v; this provides for hydrolysis of the alkoxide. A second solution containing diethanolmethylamine is dissolved in ethanol. The two solutions are thoroughly mixed and poured into molds, and gelation may occur within 30 minutes.

Another specific embodiment of the method, which uses a base catalyst for the synthesis of cross-linked aerogels, is described in EXAMPLE 1. Briefly, a first solution is prepared containing ethanol, TMOS, Trimethoxysilylproyl methacrylate (MTMS), and Eosin Y (a photoinitiator). A second solution is prepared containing diethanolomethylamine, ethanol, and the acrylic monomer Hexanedioldiacrylate (HDDA). The two solutions are thoroughly mixed and poured into molds. Gelation may occur within 60 minutes.

After gelation, monomer-containing aerogels were cross-linked by photopolymerization by exposure to high intensity Light Emitting Diodes (LEDs). As described in EXAMPLE 1, a luminous intensity of 30 mW cm$^{-2}$ at the sample location with an exposure time of 30 minutes is sufficient to produce cross-polymerization. The optimal concentration of Eosin Y, or other organic dyes such as rose Bengal, rhodamine 6G, rhodamine B, or texas red or other rhodamine derivatives, is in the range of about 1% v/v. Any other visible light or ultraviolet photoinitiator can be used, including Irgacure.

After gelation, the alcogels may be aged for two hours inside hermetically sealed molds, and then placed inside a supercritical dryer such as a pressure vessel. An excess volume of ethanol (azeotrope) is placed in the pressure vessel, and the vessel is heated to reach the supercritical temperature and pressure of the ethanol-water azeotrope mixture, and kept at supercritical conditions ($P_c$=7.31 MPa, $T_c$=526 K) for 20 minutes.

Figure 15B:
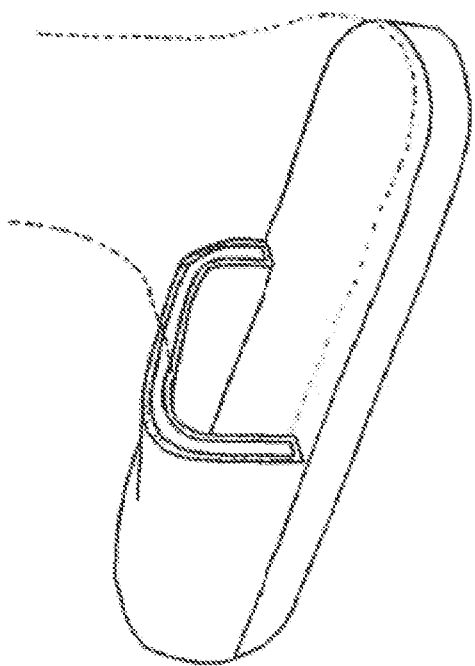
FIGS. 15A and 15B are schematic diagrams showing proposed thermally insulating, lightweight boot inner layer.
Figure 15A:
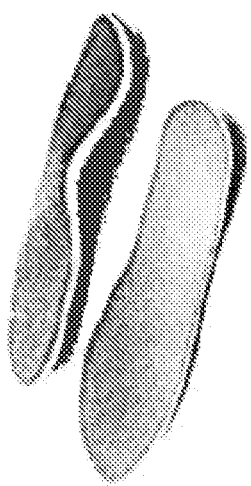
Figure 17:
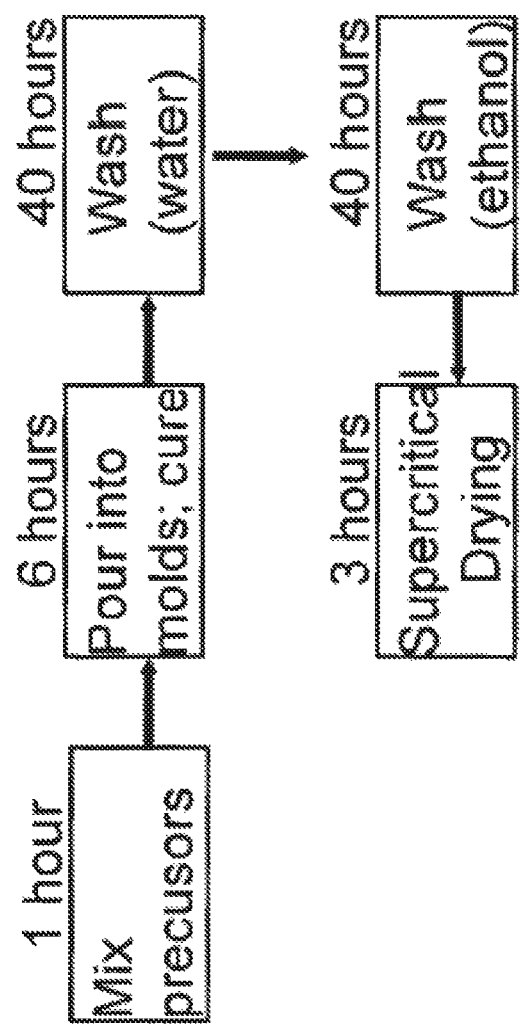
FIG. 17 is a schematic representation of a production cycle. The estimated capacity is of about 3 liters per day and it is limited by the capacity of the vessel used for supercritical drying. This vessel has a volume of 4 liters and for safety reasons it can only be filled with one liter of wet gels and one liter of ethanol. The production volume can be upscaled by employing larger pressure vessels.

In specific embodiments, the gels may be fabricated into components for use as thermal insulators. As the methods of the invention provide for the manufacture of large gel monoliths (e.g. a volume up to 100 cm$^3$), the gels can be cast into particular shapes to address a variety of applications. For example, FIGS. 15A and 15B show an embodiment produced for thermal insulation of footwear. Additionally, batch operation for large scale production of gels is feasible according to the methods of the invention. An example of a production process is shown in FIG. 17. Additionally, industrial-level upscaling employing large batch reactors and dryers is possible.

The following Examples will describe the above exemplary embodiments in more detail. However, as they are intended to illustrate the invention by way of example, they should not be used to limit the scope of the invention.

Example 1

Chemicals

Figure 1B:
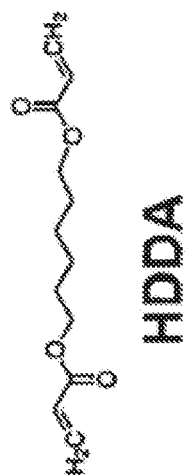
FIG. 1B is the structural formula for hexanedioldiacrylate (HDDA).

Reagent-grade TEOS, TMOS, Aluminum Chloride Hexahydrate (AICl3-6H2O), Trimethoxysilylpropyl methacrylate (MTMS), Diethanolethylamine (Amine), Eosin Y were purchased from Acros Organics. HDDA was purchased from Sigma-Aldrich. A sample of Acrylated Dipentaerythritol (OPHA) was provided by Allnex SA, Belgium. The structures of the monomers are shown in FIGS. 1A and 1B. All reagents were used as-received. The ethanol/water azeotrope mixture (containing 4.4% water and 95.6% pure ethanol by volume) was used as gelation solvent and as supercritical fluid in the drying process. Unless stated otherwise, all references to ethanol in this specification indicate the ethanol-water azeotrope mixture.

Base-catalyzed synthesis of silica aerogels TMOS was added to a 0.13 mol/l diethanolmethylamine ethanolic solution in a volume fraction between 6% and 25%. The solutions were thoroughly mixed and poured into molds. Gelation occurred within 30 minutes. From here forth, gels with the lowest (6% v/v) TMOS concentration will be referred to as low-density (LO) gels, and gels with the highest concentration will be referred to as high-density (HD) gels. The TMOS/ethanol/H2O mole ratio was 1/31.2/4.6 for the LO gels and 1/7.5/1.1 for the HD gels. During experimentation, a LD gel was made by adding 0.5 ml of TMOS to a mixture of 3 ml of ethanol and 0.045 ml of Amine.

Acid-Catalyzed Synthesis of Silica Aerogels

For industrial applications, TMOS can hardly be employed because it is hazardous and expensive. TEOS is preferred. Since the techniques disclosed in this specification may have industrial relevance, aerogels were fabricated using TEOS. Since TEOS gels very slowly in a basic environment (such as after a minimum of 16 days), and produces gels with a significantly reduced surface area (such as 110 $m^2$ $g^{-1}$), acid catalysis was employed. To minimize the amount of water added to the gelation solution, a metal salt (aluminum chloride) was used to lower the pH. A stock solution with a concentration of 1.4-10.3 $mol^{-1}$ $AlCl_3*6H_2O$ was prepared by dissolving $AlCl_3*6H_2O$ in ethanol. The pH value of this solution was found to be 2.40, which is sufficient to induce hydrolysis of the alkoxide (see S. E. Friberg, J. Yang, A. Amran, 1. Sjablom, G. Farrington, *J. Phys. Chem.* 1994, 98, 13528). Two solutions were then prepared. Solution A was prepared by adding TEOS to the aluminum chloride stock solution in a concentration between 6.6% and 25% v/v. Solution A was then left inside a hermetically closed container for a minimum of one hour to allow hydrolysis of the alkoxide. Solution B was a 0.142 $mol^{-1}$ diethanolmethylamine ethanolic solution. The solutions were thoroughly mixed and poured into molds. The amine increased the pH to about 8.5 and accelerated the condensation reaction. The TEOS/ethanol/$H_2O$ mole ratio was 1/15/2.2 for the gels with the highest TEOS concentration. Gelation occurred within 30 minutes. Since the kinetics of TEOS hydrolysis is slower than that of TMOS, a series of gels were prepared with increasing hydrolysis times. For this, solution A was prepared by adding TEOS to the aluminum chloride stock solution in a concentration of 14% v/v. Solution A was then divided into five aliquots which were left in a sealed container for times ranging between 20 and 240 minutes, followed by the addition of 0.045 ml of dimethylethylamine dissolved in 0.5 ml of ethanol. Gelation time increased with longer wait times, and gelation occurred for all of these alcogels within a few hours. A series of samples with the varied addition of between 0.167 mg and 1.167 mg of $AlCl_3$ were also created to analyze the role of the metal salt in kinetic effects. In a control experiment, the inventor also prepared alcogels using acid-catalysis of TMOS. The synthesis was carried out as described above but with the TEOS replaced by TMOS in the same concentration. The gelation solution gelled within two hours and produced an aerogel that, while having a surface area of 760 $m^2$ $g^{-1}$, shrank 20%.

Base-Catalyzed Synthesis of Cross-Linked Aerogels

A stock solution of ethanol and the photoinitiator Eosin Y was first prepared with an Eosin concentration of 4 g $l^{-1}$. Solution A consisted of ethanol (1.35 ml), Eosin stock solution (0.15 ml), TMOS (0.88 ml) and MTMS (0.04 ml). Solution B had a fixed volume of 1.62 ml and contained diethanolmethylamine (0.05 ml), ethanol and the acrylic monomer HDDA. The volume of the monomer was varied to yield a weight concentration between 10% and 40% by weight of the gelation solvent, and the volume of ethanol of solution B was varied accordingly in order to maintain a constant volume. So, for example, 40% by weight HDDA samples were prepared with solution B containing 1.12 ml of HOOA, 0.45 ml ethanol and 0.05 ml diethanolmethylamine. Solutions A and B were thoroughly mixed and poured into molds. Gelation occurred within 60 minutes.

Photopolymerization

Monomer-containing alcogels were cross-linked by photopolymerization. Photopolymerization was preferred to thermal polymerization because heating introduces solvent evaporation issues which are difficult to tackle when large monoliths are being fabricated. As shown in previous work (see C. Wingfield, A. Baski, M. F. Bertino, N. Leventis, D. P. Mohite, H. Lu, *Chem. Mater.* 2009, 21, 2108 ("Wingfield et al., 2009)) ultraviolet (UV) photoinitiation is not recommended; UV light is strongly absorbed by the organics in the gelation solution and penetration is typically less than 10 mm. For this reason, Eosin Y, a photoinitiator which absorbs in the green region of the visible spectrum, was employed to ensure that light could penetrate through alcogels of any thickness. Upon light absorption, charge is transferred between the Eosin Y dye and the coinitiator dimethanolmethylamine, resulting in a reduced radical dye species and a coinitiator radical capable of initiating polymerization (see H. J. Avens, C. N. Bowman, *J. of Polymer Sci.* 2009, 47, 6083 and D. Burget, C. Mallein, J. P. Fouassier, *Polymer* 2004, 45, 6561) and the illumination system consists of eight green light emitting diodes (LEDs) which are arranged symmetrically around the sample. The LEDs have a power of 1 Watt and the luminous intensity, measured with a power meter (Thor Labs), is 30 mW $cm^{-2}$ at the sample location. Typical exposure times were 30 minutes and the samples were rotated every 10 minutes within the diode array to ensure homogeneous illumination.

A series of trials were conducted to determine the optimum Eosin Y concentration. Excessive concentrations of Eosin Y prevented light penetration through the alcogels and led to polymerization only in the outer layers of the gels. Low Eosin Y concentrations led to mechanically weak monoliths, indicating partial polymerization. The Eosin Y concentration yielded uniformly polymerized aerogels in less than 30 minutes and was used for most experiments.

Supercritical Drying of Alcogels in Ethanol/Water Azeotrope Mixture

After gelation, the alcogels were aged for a minimum of two hours inside hermetically sealed molds. Shorter aging times resulted in extremely weak, crack-prone monoliths; longer aging times of up to 3 days yielded monoliths with physical properties that coincided within error with those of monoliths aged for two hours. The alcogels were removed from the molds after aging and placed inside the supercritical dryer. The supercritical dryer used to dry the samples was a Parr Instruments model 4602 pressure vessel with a capacity of 2 liters. The pressure vessel was equipped with a thermowell, and it was heated by three ceramic heaters, each with a power of 800 W. Heating rates were controlled by varying the power delivered to the heaters with a variac. To prevent solvent evaporation from the alcogels before the supercritical point was reached, an excess volume of ethanol (azeotrope) was poured into the drying vessel. For a 2-liter vessel the present inventor found that a minimum of about 300 ml of ethanol had to be added to prevent cracking and shrinking of the monoliths. The pressure vessel was heated to reach the supercritical temperature and pressure of the ethanol-water azeotrope mixture ($P_c$=7.31 MPa, $T_c$=526 K), kept at supercritical conditions for 20 minutes and then vented.

To further reduce the drying temperature dry ethanol was used as the drying fluid; however, supercritical drying in pure ethanol yielded small monoliths which were crackfree and large monoliths with a cracked core. This effect was likely caused by the supercritical temperature ($T_c$) of the water-ethanol azeotrope mixture inside the alcogels, which was higher than the $T_c$ of the dry ethanol surrounding the alcogels. When the dry ethanol had reached its critical temperature, the fluid inside the alcogel was 20-30 K away from its critical temperature. The fluid inside the alcogel transitioned from liquid to vapor and caused capillary stresses. These stresses were less evident in small monoliths, since the dry solvent probably had sufficient time to diffuse inside the monoliths while the vessel was being heated.

Results and Discussion

Fabrication Procedure.

The fabrication method of this EXAMPLE employs a single wet-chemistry step and produces alcogels that can be dried supercritically without requiring any solvent exchanges. The key to this method is use of the ethanol-water azeotrope mixture as gelation solvent and supercritical drying fluid. The water concentration (4.4% by volume) of the ethanol-water azeotrope is lower than the water concentrations typically employed for alkoxide hydrolysis-condensation (up to 35% by weight). Because of the lower water concentration, gelation is about two times slower than with conventional methods. The longer gelation time is, however, more than compensated by two major advantages. The most important advantage is that the low water concentration reduces the drying temperature. Bazaev et al. (see E. A. Bazaev, A R. Bazaev, A. A. Abdurashidova, *High Temp.* 2009, 47, 195) have shown that the critical temperature ($T_c$) and pressure ($P_c$) point of ethanol-water mixtures with an ethanol mole fraction x can be calculated with an accuracy of a few percent using the following equations:

$$T_c=647.1-239x+177.76x^2-71.93x^3 \quad (1)$$

$$P_c=22.06-37.37x+37.15x^2-15.72x^3 \quad (2)$$

Typical gelation solutions used by other groups contain water in a concentration between 15 and 35% by weight (see J. Phalippou, T. Woignier, M. Prassas, *J. Mater. Sci.* 1990, 25, 3111). For these water concentrations, Eqs. (1) and (2) yield $T_c$ between about 540 and 560 K and $P_c$ between about 8.5 and 10.5 MPa, respectively. The water-ethanol azeotrope mixture has an ethanol mole fraction x=0.87, for which Eqs. (1) and (2) yield $T_c$=526 K and $P_c$=7.31 MPa. Since the reaction rate of the solvent with the silica framework increases exponentially with temperature (see K. G. Sharp, *J. Sol-Gel Sci. Techn.* 1994, 2, 35) the lower drying temperature of the technique of this EXAMPLE reduces silica dissolution, monolith shrinkage, pore derivatization with hydrocarbons and other undesirable byproducts. In most previous reports (see G. M. Pajonk, A. V. Rao, B. M. Sawant, N. N. Parvathy, *J. Non-Cryst. Solids* 1997, 209, 40 ("Pajonk et al., 1997"); L. Kocon, F. Despetis, J. Phalippou, *J. Non-Cryst. Solids* 1998, 225, 96 ("Kocon et al., 1998"); S. Yoda, S. Ohshima, *J. Non-Cryst. Solids* 1999, 248, 224 ("Yoda and Oshima., 1999"); and Wingfield et al., 2009) the gelation solvent contained a high water concentration and it had to be exchanged with a dry solvent to lower the drying temperature and thence the rate of the undesired reactions. With the technique of this EXAMPLE, drying can be carried out right away.

An additional subtle difference exists between the technique of this EXAMPLE and previous reports which greatly accelerates and simplifies drying. This difference is mold-free drying, which shortens gel aging times and allows rapid heating and venting of the pressure vessel. After gelation, alcogels were aged for two hours before drying. This aging time is very short when compared to previous reports. Pajonk et al. (see Pajonk et al., 1997) for example, reported that aging for several days was necessary to obtain crack-free monoliths using supercritical organic solvent drying. This did not occur with the technique of this EXAMPLE. More than 150 crack-free aerogel samples of different sizes with an aging time of two hours were fabricated. As for heating and venting rates, crack-free monoliths with heating rates as high as 125° C. $hr^{-1}$ and venting rates as high as 0.4 MPa per minute could be produced (such a high venting rate, however, is not recommended; it was used only once and because of an unannounced fire drill). Pajonk et al. (see Pajonk et al., 1997) instead, reported that crack formation could result unless very slow heating- and venting-rates were employed, and their process required one to two days. The longer curing times and the slow drying reported by Pajonk et al. are probably due to the fact that their samples were dried inside cylindrical glass test tubes with only one (top) opening (see Pajonk et al., 1997). Alcogels likely experienced stress during heating because of the different expansion coefficients of glass, solvent and gel skeleton. Longer curing times are known to improve the mechanical characteristics of alcogels and probably helped the monoliths survive the mechanical stresses. In addition, in Pajonk's experiments (see Pajonk et al., 1997) vapors could only escape only through the top aperture of the test tubes, which likely posed constraints on venting rates. The alcogels of this EXAMPLE were instead placed inside the drying vessel without molds. Mold-free drying prevented mechanical stresses due to differences in thermal expansion of gel and mold, increased the area from which the vapors could escape and thus enabled the short aging and rapid drying which characterize the technique of this EXAMPLE. A second advantage of the technique of this EXAMPLE is that the low water content of the gelation solution alleviates monomer solubility issues. The following section will show that native and cross-linked aerogels produced with the technique of this EXAMPLE have physical properties in line with expectations.

Native Oxide Aerogels.

Figure 2A:
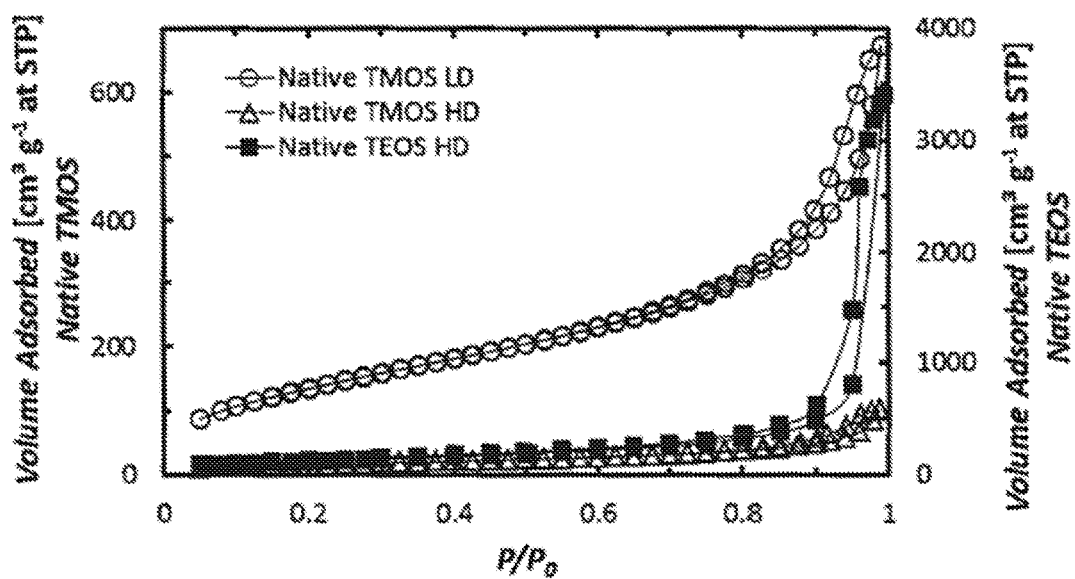
FIG. 2A is a graph showing adsorption isotherms of three native oxide aerogels fabricated in the experiments described in EXAMPLE 1. Open circles: low density (LD) native oxide aerogels, prepared using a 5.5% (by volume, v/v) tetramethylorthosilane (TMOS) concentration in the gelation solution. Open Triangles: high density (HD) native oxide aerogels, prepared using a 22% v/v TMOS concentration. Filled squares: high density (HD) native oxide aerogels, prepared using a 25% v/v tetraethyl orthosilicate (TEOS) concentration.
Figure 2B:
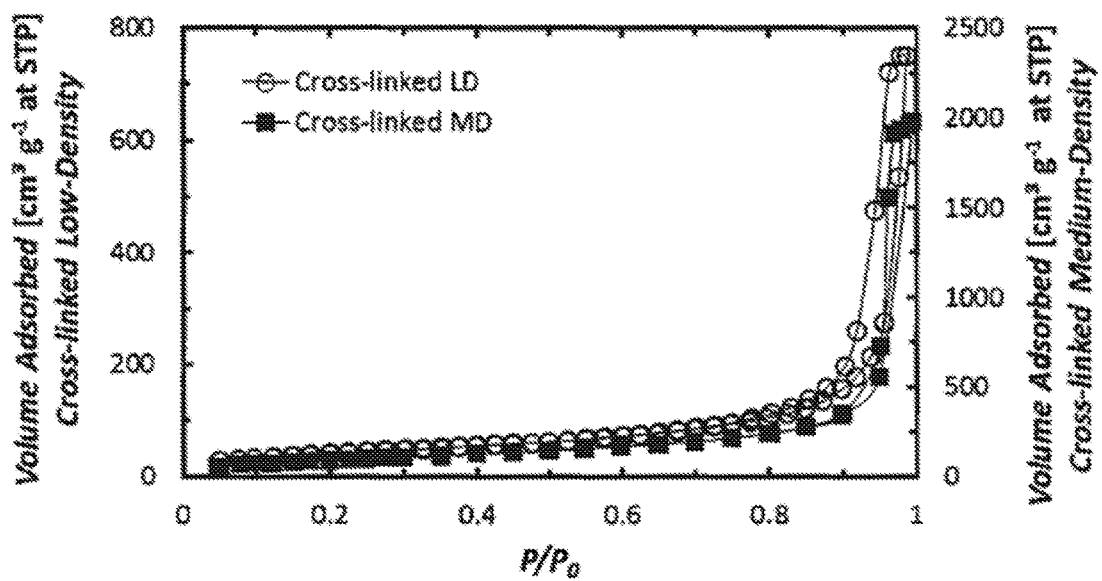
FIG. 2B is a graph showing adsorption isotherm of two cross-linked aerogels fabricated in the experiments of EXAMPLE 1. Open circles: (LD) cross-linked aerogels, 7% v/v monomer concentration.

As detailed in Table I below and FIGS. 2A and 2B and FIG. 3, native oxide aerogels fabricated with the present technique have surface areas of several hundred square meters per gram, mean pore sizes of tens of nanometers and densities below about 0.2 g $cm^{-3}$. These values are expected for monoliths dried in supercritical solvents. Monoliths dried in supercritical solvents have a surface area 2-3 times smaller than their counterparts dried in supercritical CO2 due to syneresis (network densification) (see M. Schneider, A. Baiker, *Catal Rev.* 1995, 37, 515 ("Schneider and Baiker 1995")). Supercritical solvent drying is, in essence, a hydrothermal process which leads to Ostwald ripening of the skeletal oxide nanoparticles and to a reduced micropore volume (see Schneider and Baiker, 1995; and N. Al-Yassir, R. Le Van Mao, *Can. J. Chemistry* 2008, 86, 146) For example, Chhor et al. (K. Chhor, J. F. Bocquet, C. Pommier, *Mater. Chem. Phys.* 1992, 32, 249) reported that $TiO_2$ micron-sized, porous particles had a surface area of 150 $m^2$ $g^{-1}$ when they were synthesized in liquid ethanol and of 40 $m^2$ $g^{-1}$ when they were synthesized in supercritical ethanol. A surface area reduction of about 25% was observed after hydrothermal treatment of alumina aerogels (see N. Al-Yassir, R. Le Van Mao, *Can. J. Chemistry* 2008, 86, 146 and H. Arai, M. Machida, *Appl. Catal. A.-Gen* 1996, 138, 161) and aging of wet silica gels in hot (100° C.) ethanol (see F. He, H. Zhao, X. Qu, C. Zhang, W. Qiu, *J. Mater. Process Tech.* 2009, 209, 1621) or water (see G. Reichenauer, *J. Non-Cryst. Solids* 2004, 350, 189; A. Rigacci, M. A Einarsrud, E. Nilsen, R. Pirard, F. E. Dolle, B. Chevalier, *J. Non-Cryst. Solids* 2004, 350, 196) has been shown to reduce the surface area of aerogels by up to 30% (see N. Leventis, *Accounts Chem. Res.* 2007, 40, 874) and to increase the mean pore size by up to 3 times.

Figure 3:
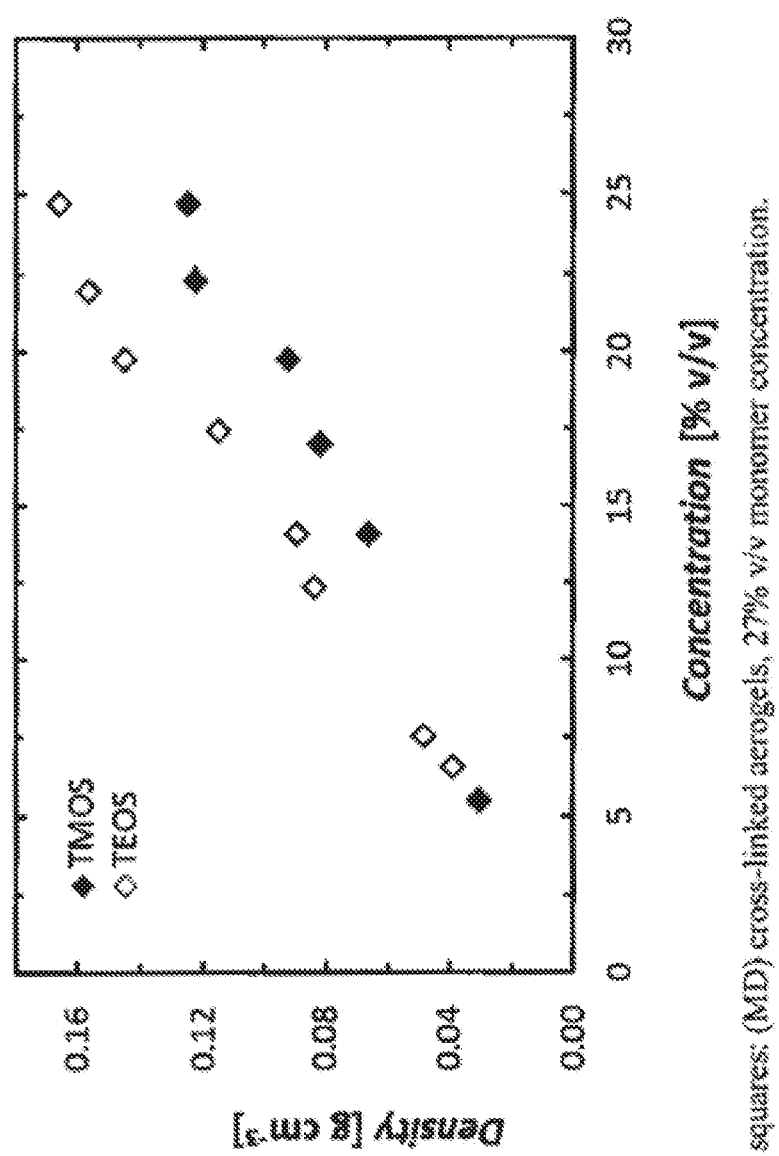
FIG. 3 is a graph showing the density of aerogels fabricated in the experiments of EXAMPLE 1 as a function of alkoxide concentration in the gelation solution for TMOS (base-catalyzed) and TEOS (acid-catalyzed). Aerogels synthesized using TMOS and acid catalysis had densities that coincided within error with those of aerogels prepared using acid-catalyzed TEOS.
Figure 4:
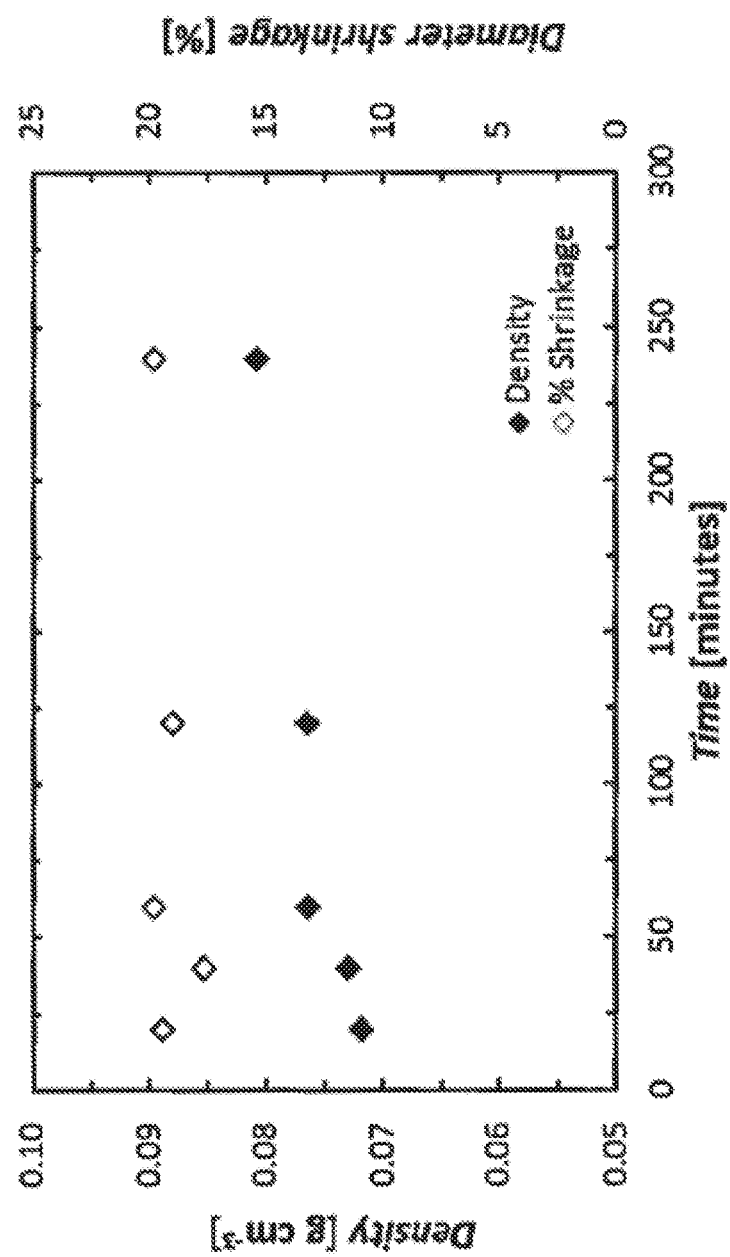
FIG. 4 is a graph showing the density and shrinkage of acid-catalyzed aerogels fabricated in the experiments of EXAMPLE 1 as a function of hydrolysis time. The gelation solution contained TEOS in a concentration of 12.4% v/v.
Figure 5:
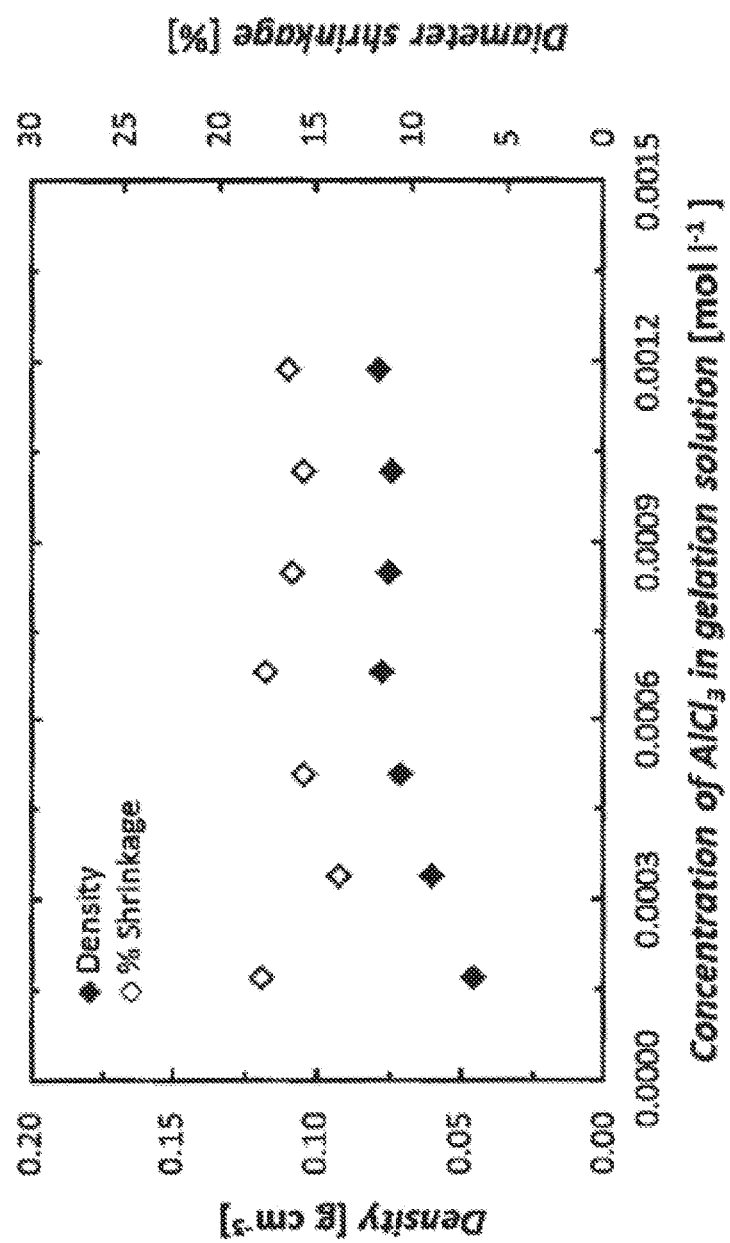
FIG. 5 is a graph showing the density and shrinkage of acid-catalyzed aerogels fabricated in the experiments of EXAMPLE 1 as a function of the amount of $AlCl_3 \cdot 6H2O$ added to the gelation solution. The gelation solution contained TEOS in a concentration of 12.4% v/v.

The data reported in FIG. 3 shows that the density of aerogels obtained using acid catalyzed synthesis was on average 20% higher than that of aerogels obtained using base catalyzed synthesis. This difference is due to shrinkage, which was on the order of 20% for acid catalyzed aerogels and of about 5% for base-catalyzed aerogels, see also Table 1. The different shrinkage (see C. J. Brinker, *J. Non-Cryst. Solids* 1988, 100, 31 ("Brinker, 1988") and C. J. Brinker, K. D. Keefer, D. W. Schaefer, C. S. Ashley, *J. Non-Cryst. Solids* 1982, 48, 47 ("Brinker et al. 1982") is attributed to the different morphologies of acid- and base-catalyzed alcogel skeletons. Acid catalysis yields highly branched skeletal nanoparticles which are prone to collapse, especially when subject to the elevated temperatures of supercritical drying. In comparison, base catalysis yields dense and morphologically stable spherical nanoparticles (see Brinker, 1988 and Brinker et al. 1982). To rule out kinetic effects due to the role of water and acid concentration, aerogels were prepared with varying hydrolysis durations and concentrations of the acidifying AlCl). Shrinkage and density of the acid-catalyzed aerogels only weakly depended on these parameters, as shown in FIGS. 4 and 5.

TABLE I

Physical characteristics of native and cross-linked aerogels

| Aerogel class | Alkoxide, monomer concentration in gelation solution [% volume] | BET surface area [$m^2$ $g^{-1}$] | BJH mean pore size [nm] | Linear shrinkage after drying [%] | Density [g $cm^{-3}$] | Young's modulus [MPa] |
|---|---|---|---|---|---|---|
| Native silica (LD) | TMOS 5.5, HDDA 0 | 510 | 28 | 5 | 0.03 | Not measurable (monolith cracked when contacted by anvil) |
| Native silica (HD) | TMOS 22, HDDA 0 | 310 | 40 | 5 | 0.11 | 0.48 |
| Native silica (HD) | TEOS 25, HDDA 0 | 450 | 45 | 21 | 0.17 | Not measurable (monolith cracked when contacted by anvil) |
| Cross-linked (LD) | TMOS 27, HDDA 7 | 350 | 46 | 13 | 0.27 | 10 |
| Cross-linked (MD) | TMOS 22, HDDA 27 | 154 | 35 | 8 | 0.46 | 43 |

Monolith shrinkage was also observed, which for base-catalyzed gels was on the order of 5%. This shrinkage is comparable to the shrinkage observed for monoliths dried in supercritical CO2 but it is considerably smaller than the shrinkage reported by previous work which employed supercritical solvent drying (see Pajonk et al., 1997, Kocon et al., 1998, Yoda and Oshima, 1999, and Wingfield et al., 2009). For example, Kocon et al. (Kocon et al., 1998) and Yoda and Oshima (Yoda and Oshima, 1999) reported a shrinkage of up to 20%, which was attributed to the increased solubility of silica in organic solvents at high temperatures (see J. Gross, P. R. Coronado, L. W. Hrubesh, *J. Non-Cryst. Solids* 1998, 225, 282 ("Gross et al., 1998"); and A. M. Anderson, C. W. Wattley, M. K. Carroll, *J. Non-Cryst. Solids* 2009, 355, 101 ("Anderson et al., 2009")). In the present experiments, shrinkage was not observed for two reasons: the supercritical fluid was ethanol, for which silica solubility is about 7 times lower than for the methanol used by those authors (Kocon et al., 1998 and Yoda and Oshima, 1999) and drying temperatures were about 30 K lower than those employed in Refs. (see Gross et al., 1998; Anderson et al., 2009 Kocon et al., 1998; and Yoda and Oshima, 1999).

Cross-Linked Aerogels.

Figure 6:
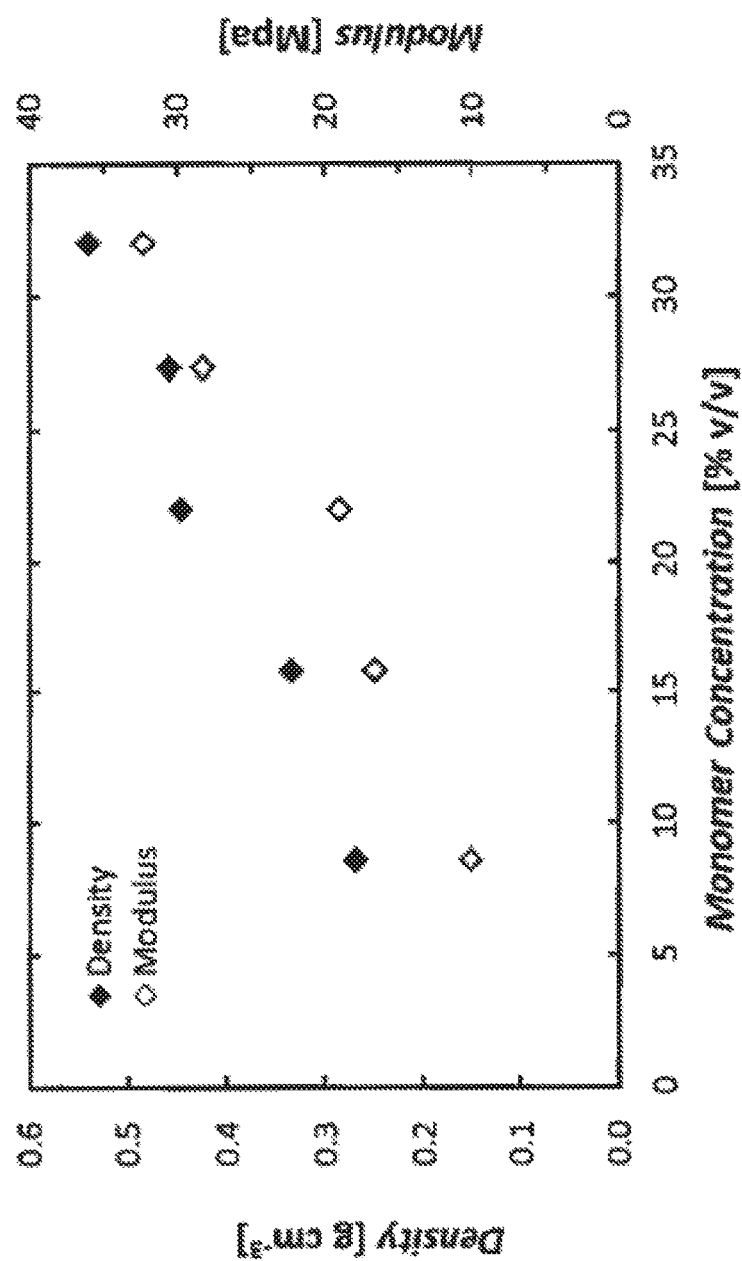
FIG. 6 is a graph showing dependence of Young's modulus and density of cross-linked aerogels fabricated in the experiments of EXAMPLE 1 on HDDA concentration. An exposure time of 100 minutes in samples with 0.6 mg of Eosin Y each was used to guarantee homogeneous polymerization of each sample.

In the present work, the general principles of aerogel cross-linking and derivatized the pore walls with an acrylic group by adding trimethoxysilylpropyl methacrylate (MTMS) to the gelation solution was followed. The use of the ethanol-water azeotrope mixture as a gelation solvent alleviated monomer solubility issues and simplified processing. In previous work (see Wingfield et al., 2011) it was noticed that the high water concentration of the gelation solution imposed the use of monomers that were at least partially water-dispersible, such as methyl methacrylate, usually in a concentration below about 10% by weight. By using the ethanol-water azeotrope mixture, gelation solutions could be prepared using a highly hydrophobic monomer such as HDDA in a concentration as high as 40% by weight which gelled in approximately one hour. After aging for two hours, wet gels were cross-linked by visible light photopolymerization as described in the experimental section. HDDA was chosen because it is a highly reactive monomer which is often used as a benchmark in photopolymerization (see LJ Mathias, B. S. Shemper, M. Alirol, J. F. Morizur, *Macromolecules* 2004, 37, 3231; C. N. Bowman, C. J. Kloxin, *AIChE Journal* 2008, 54, 2775; and N. B. Cramer, C. N. Bowman, *Journal of Polymer Science Part A: Polymer Chemistry*, 2001, 39, 3311). FIGS. 2A and 2B, FIG. 6, and Table 1 show that the cross-linked aerogels produced with the present one-pot method had physical characteristics that met expectations for cross-linked aerogels. Surface areas of the products were on the order of 100-300 $m^2\ g^{-1}$; pore sizes were on the order of tens of nanometers because of syneresis; and densities were between about 0.2 and 0.5 g cm·3. Shrinkage was between 7 and 10%, which is typical for cross-linked monoliths. Shrinkages between about 7% and 28% have been reported by previous work and are attributed to compression of the skeletal secondary particles by the crosslinking polymer (see M. A. B. Meador, C. M. Scherzer, S. L. Vivod, D. Quade, B. N. Nguyen, ACS *Appl. Mater. Interfaces* 2010, 2, 2162). Moduli were between about 10 and 30 MPa and increased with the concentration of monomer in the gelation solution, as may be seen in FIG. 6. The measured moduli may appear low when compared to the moduli of several hundred MPa which are often reported for cross-linked aerogels (see N. Leventis, *Accounts Chem. Res.* 2007, 40, 874). This discrepancy is due to the choice of monomer. HDDA is a very flexible molecule, which leads to polymers with a modulus between about 10 and 50 MPa (see L. G Lovell, C. N. Bowman, *Polymer* 2003, 44, 39 and O. L. Safranski, K. Gall, *Polymer* 2008, 49, 4446). Thus, the modulus of the aerogels of this EXAMPLE agrees with expectations for a polymer synthesized from HDDA. Preliminary results indicate that monoliths with a modulus of up to 400 MPa can be fabricated using the pentacrylate DPHA, whose structure is reported in FIG. 1A. The reason for this large difference in moduli is due to the penta-functionality of DPHA monomers that produces three-dimensional network structures. When compared to the modulus of HDDA, a bi-functional molecule that can only form linear polymer chains, the high modulus of DPHA-cross-linked aerogels confirms formation of a network structure.

Figure 7:
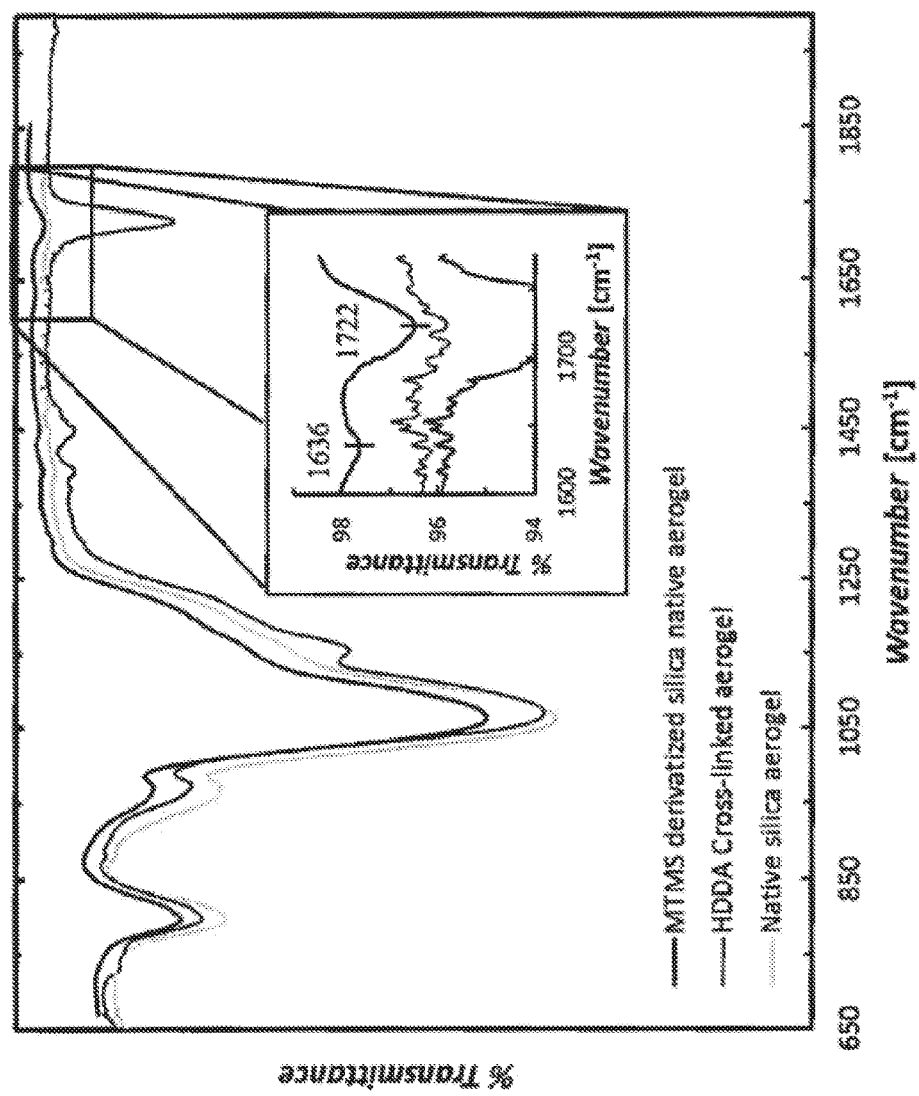
FIG. 7 is an FT-IR spectra of aerogel monoliths fabricated in the experiments of EXAMPLE 1 after supercritical drying.

Derivatization and engagement of the surface acrylic moiety during polymerization were confirmed by FT-IR analysis, reported in FIG. 7. In native silica gels broad peaks at about 800 $cm^{-1}$ and 1063 $cm^{-1}$ were observed, which corresponded to the Si—O stretch and the Si—O—Si stretch respectively (see G. E. Walrafen, M. S. Hokmabadi, N. C. Holmes, W. J. Nellis, S. Henning, *J. Chem. Phys.* 1985, 82, 2472). In silica aerogels that had been derivatized with MTMS but had not been cross-linked, additional peaks were evident at 1395, 1449, 1636 and 1722 $cm^{-1}$. Peaks in the 1390-1450 $cm^{-1}$ region are due to Sp3 C—H bending. The weak peak at 1636 $cm^{-1}$ and a relatively large peak at 1720 $cm^{-1}$ are attributed to C=C stretch and the C=O stretch, respectively. In crosslinked aerogels the peak at 1636 $cm^{-1}$ was absent, indicating engagement of the surface moiety by the polymerization process (see H. J. Avens, C. N. Bowman, *J. of Polymer Sci.* 2009, 47, 6083 and D. Burget, C. Mallein, J. P. Fouassier, *Polymer* 2004, 45, 6561). FT-IR data was collected after supercritical drying and it provided a first indication that the cross-linking polymer had not been affected by the high temperatures. The presence of the C=C stretch in MTMS-derivatized aerogels indicated that the surface acrylic moiety was not attacked during drying; the absence of the C=C stretch peak in cross-linked aerogels indicated that polymer attachment to the silica walls was not affected by drying.

Figure 8:
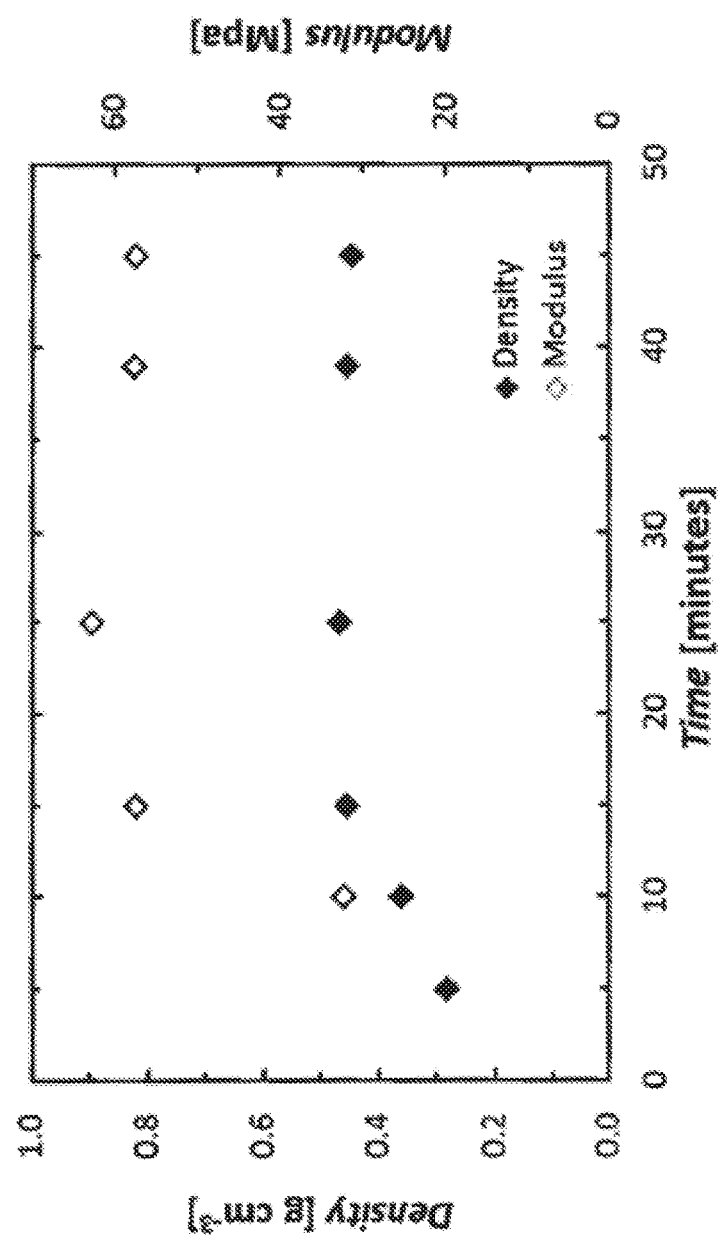
FIG. 8 is a graph showing dependence of density and Young's modulus of cross-linked aerogels fabricated in the experiments of EXAMPLE 1 on exposure time. The gelation solution had a TMOS concentration of 21.5% v/v, and the HDDA concentration was 27.4% v/v.

The characterization results confirm therefore that cross-linked, mechanically strong aerogels could indeed be produced in a few hours. Several additional tests were carried out to document the influence of processing parameters on the physical properties of the monoliths. FIG. 6 shows that modulus and density increased nearly linearly with HDDA concentration in the gelation solution, in agreement with reports by the Leventis group (see M. A. B. Meador, L. A. Capadona, L. McCorkle, D. S. Papadopoulos, N. Leventis, *Chem. Mater.* 2007, 19, 2247) and more recently, by Meador et al. (see M. A. B. Meador, C. M. Scherzer, S. L. Vivod, D. Quade, B. N. Nguyen, *ACS Appl. Mater. Interfaces* 2010, 2, 2162). The effect of exposure times was also investigated. Density and modulus of the monoliths both increased for exposure times below about 15 minutes, and remained constant afterwards, as shown in FIG. 8.

Figure 9:
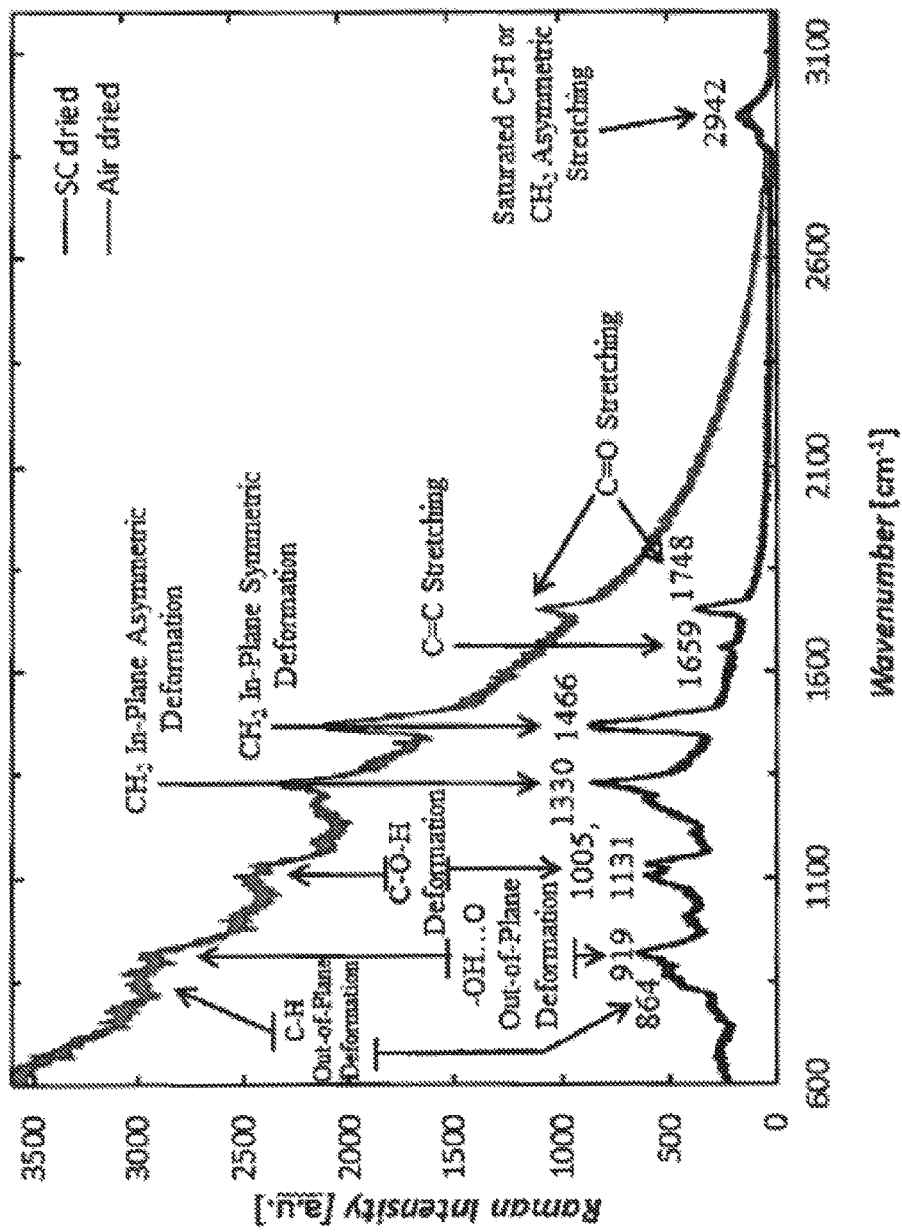
FIG. 9 is a Raman spectra of HDDA polymer monoliths prepared by photoinitiated polymerization in EXAMPLE 1, one dried in air and one dried supercritically.

Further tests were carried out to demonstrate that the cross-linking polymer was not degraded by drying. In one test, an ethanolic solution of HDDA and the initiator Eosin was prepared which had the same composition of the gelation solution, except that the alkoxide had been replaced by an equivalent volume of ethanol. The solution was poured into two transparent molds which were exposed to green light until solid cylindrical monoliths were obtained. After exposure, one sample was dried in air and the other supercritically. The physical properties of these polymer monoliths nearly coincided. The air-dried sample exhibited a 5.5% shrinkage, a density of 0.410 g $cm^{-3}$, a surface area of about 20 $m^2\ g^{-1}$ and a Young's modulus of 29.7 MPa. The supercritically dried sample shrank by 3.5%, had a density of 0.406 g $cm^{-3}$, a surface area of about 15 $m^2\ g^{-1}$ and a Young's modulus of 29.2 MPa. FIG. 9 compares the Raman spectra of the air-dried and supercritically dried polymer samples. With the exception of a higher luminescence background in the air-dried sample, the Raman spectra exhibited the same peaks in the two samples and continued that no chemical degradation took place during supercritical drying.

Figure 10:
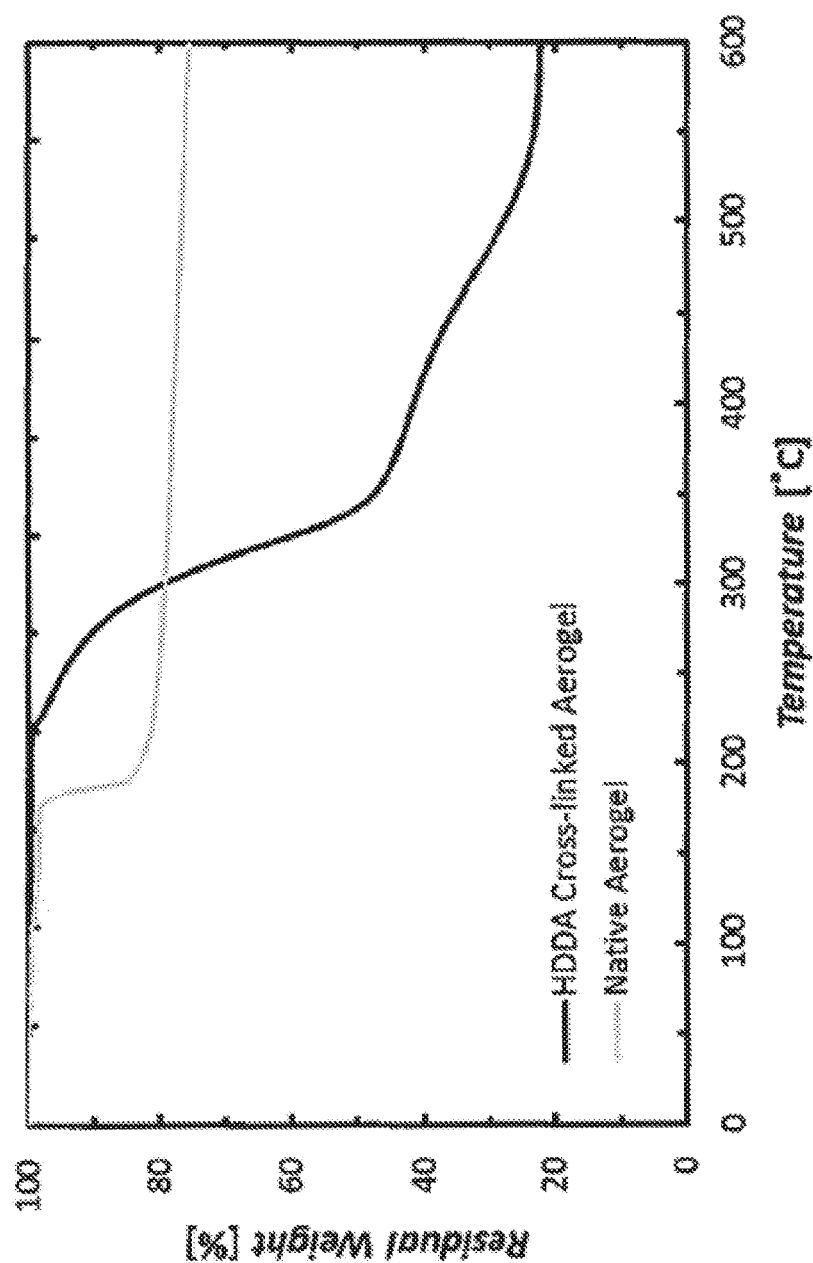
FIG. 10 is a graph showing TGA (thermogravimetric analysis) measurements of native and HDDA cross-linked aerogels fabricated in the experiments of EXAMPLE 1.

FIG. 10 reports TGA (thermogravimetric) analysis of native and HDDA cross-linked aerogels. For both sample types, a decrease in weight starts around 219° C. In the native aerogels, the weight loss is likely due to sublimation of unreacted alkoxy groups and, possibly, carbonaceous drying residues. As for the HDDA sample, it was noticed that the weight loss at 250° C., which is drying temperature, is less than 5%. TGA analysis also shows a weight difference of about 78% between the weight of cross-linked monoliths at room temperature and at 600° C. This weight loss is in agreement with the 76% polymer weight that can be calculated from the composition of the gelation solution. The 72% weight loss is also in agreement with reports by Katti et al., (A. Katti, N. Shimpi, S. Roy, H. Lu, E. F. Fabrizio, A. Dass, L. A. Capadona, N. Leventis, *Chem. Mater.* 2005, 18, 285) and by Douan et al., (see Y. Douan, S. C. Lana, B. Lama, M. P. Espe, *Langmuir* 2013, 29, 6156) where a polymer content of about 70% by weight was measured for cross-linked aerogels using TGA. The polymer content figures are interpreted as additional confirmation that drying in supercritical ethanol-water azeotrope does not substantially affect the cross-linking polymer.

Fabrication of Large Monoliths

Using the present technique fabrication time does not depend on the dimensions of the monoliths since aerogels are fabricated in one pot and no solvent exchange is necessary. FIG. 11A shows a native oxide monolith in the shape of a cube with a side of 25 mm and FIG. 11B shows a cross-linked parallelepiped with a size of 12×25×25 mm. Both monoliths were fabricated in less than 6 hours, starting from the sol. It is noted that the monolith of FIG. 11B could be glued to a concrete cinder block (grey background in FIG. 11B) without any noticeable shearing. FIGS. 11C and 11D show that the simplicity and rapidity of the present technique allows for experimentation in fields which are not traditional for aerogels. In less than one day, art students decorated the dried monoliths with acrylic paint. This is important, since aerogels have been employed as decorative materials in the recent past. To date, their market share has remained very limited because of the length and complexity of the fabrication process.

Example 2

The most cost-effective synthetic path is to use one-pot, water-based formulations. Currently, most research groups prepare aerogels using silicon alkoxide precursors, which are expensive and often hazardous. A synthetic approach can be developed which is capable of yielding wet gels which are castable into molds and photocross-linkable with a polymer. In this approach a sodium silicate solution is added to a 10 N solution of HCl. A base (or a buffer) solution is then added to bring the pH around 3. Gels are formed within a few hours with a $SiO_2$ concentration between 3 and 5% by weight. This approach is very similar to that developed originally by Kistler (see S. S. Kistler, *J. Phys. Chem.*, 1932, 36 (1), pp 52-64 and S. S. Kistler, Nature 127, 3211 (1931)), with one minor modification. Gelation time decreases with increasing pH, and the solutions of this EXAMPLE have a higher pH than in Kistler's work to accelerate gelation. The pH of the solution is of about 3, while Kistler used a pH of about 2. This is done because casting molds are occasionally not leak tight and a gelation time of 15 minutes or shorter is preferred to minimize loss of liquid. Such a short gelation time requires a pH around 3. The precursor solution is then cast into molds. Sample preparation is very simple and the wet gel monolith was prepared by someone who did not have any previous chemical training.

2. Research Design and Methods

The next step is the development of a water-based formulation which includes a monomer and an initiator and allows one-pot gelation and cross-linking. For this, known synthetic routes can be combined. Specifically, a silicon alkoxide carrying a polymerizable moiety, e.g., vinyltriethoxysilane, can be added to the gelation solution. Addition of this class of alkoxides is a standard method of derivatization of the pores of silica wet gels (see N. Leventis, *Accounts of Chemical Research.*, 2007, 40, 874). Typically, the alkoxides can be added in a few percent by weight and thus will not increase significantly the production costs. For the one-pot formulation, a water-soluble monomer can also be added to the gelation solution. Samples of water-soluble diacrylates have been obtained from Cytec (Cytec Industries Inc., Smyrna, Ga., USA), an industry leader in the formulation of coatings. Monoliths with a modulus of about 300 MPa can be obtained by adding monomer in a concentration of about 20% by weight to the gelation solution (see C. Wingfield, A. Baski, M. F. Bertino, N. Leventis, D. P. Mohite, and H. Lu, *Chem. Mater.*, 2009, 21, 2108). Given the high solubility of Cytec's acrylate monomer in water (up to 40% by weight will dissolve in water), no difficulties in achieving a one-pot formulation are anticipated. The photoinitiator will consist of a dye such as Eosin Y as initiator and of a tertiary amine as a co-initiator. When Eosin Y absorbs light, it oxidizes and forms a reduced amino radical which is capable of initiating polymerization (see H. J. Avens, C. N. Bowman, *J. of Polymer Sci.*, 2009, 47, 6083 and D. Burget, C. Mallein, J. P. Fouassier, *Polymer,* 2004, 45, 6561). The dye of choice, Eosin Y, absorbs strongly in the green and allows initiation with visible light. The photoinitiator is very efficient and exposure to a incandescent lamp (200 W) is sufficient to produce cross-linked aerogels in about one hour (see C. Wingfield, A. Baski, M. F. Bertino, N. Leventis, D. P. Mohite, and H. Lu, *Chem. Mater.,* 2009, 21, 2108 and C. Wingfield, L. Franzel, M. F. Bertino, N. Leventis, *J. Mater. Chem.*, 2011, 21, 11737). The proposed parts are quite large, and regioselective cross-linking can be achieved by masking regions with tape or black paper. Specialized equipment such as lithographic masks and exposure tools is not required.

Fabrication of custom parts. The plan of this EXAMPLE is to fabricate custom parts. The main advantage of the disclosed photocrosslinking technique is that parts can be reinforced only in the regions of highest mechanical solicitation, or where bonding or fastening are needed. There is no other available technique on the market which provides for regioselective reinforcement, and that will provide an additional edge over most manufacturers. Three proof-of-concept components for use as thermal insulators can be manufactured as follows.

3. Thermal Insulation of Selected Parts of Internal Combustion Engines.

Figure 12A:
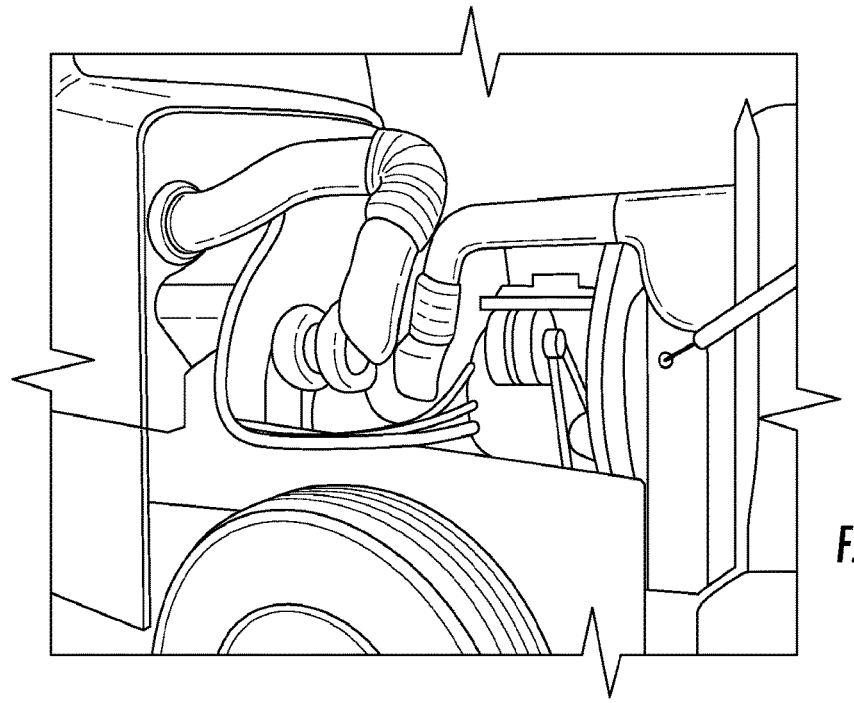
FIGS. 12A and 12B are photographs showing an example of thermal insulation of truck engine exhausts with aluminum-coated fiberglass sheets.
Figure 12B:
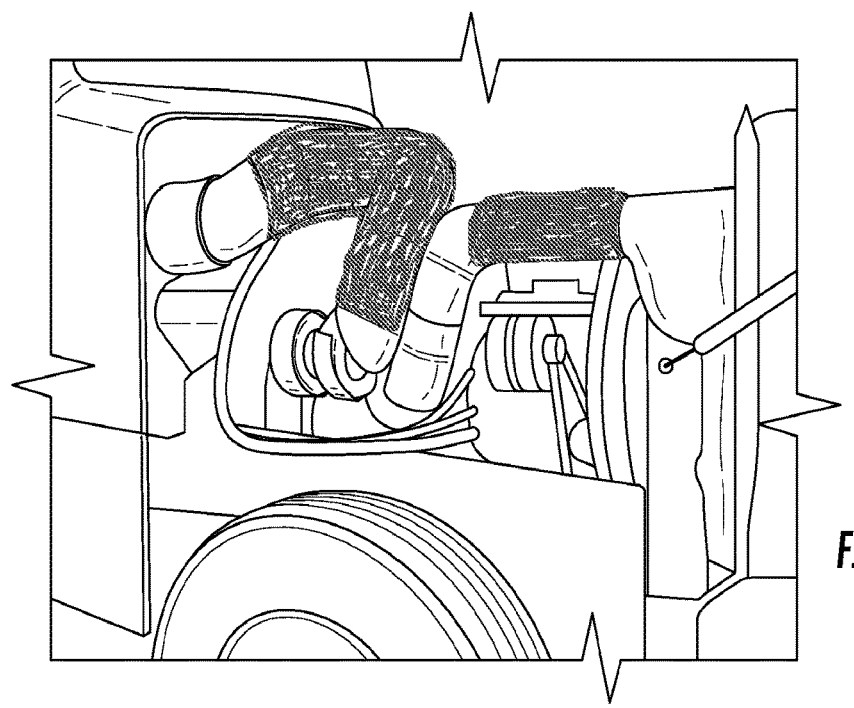
Figure 13B:
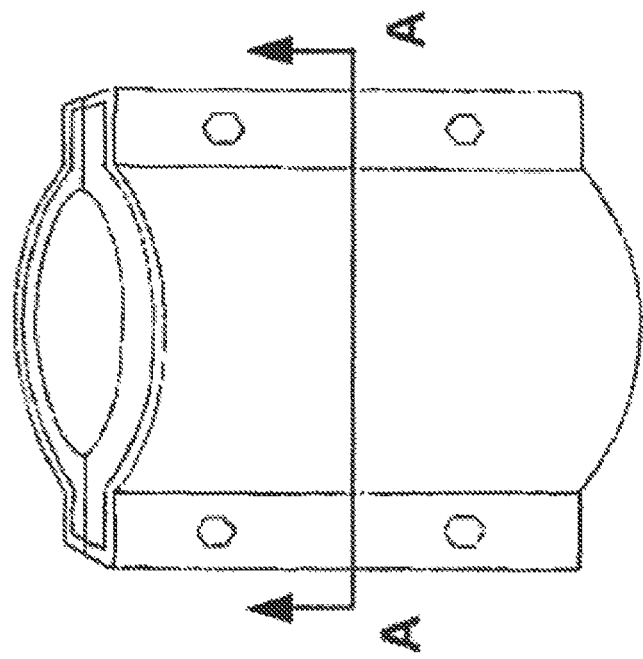
FIGS. 13A and 13B are schematic representations of an aerogel cylinder for insulation of car exhausts. The hatched (exterior) regions are those where polymer reinforcement is foreseen. The inner part of the cylinder will be a native aerogel in contact with the hot exhaust.
Figure 13A:
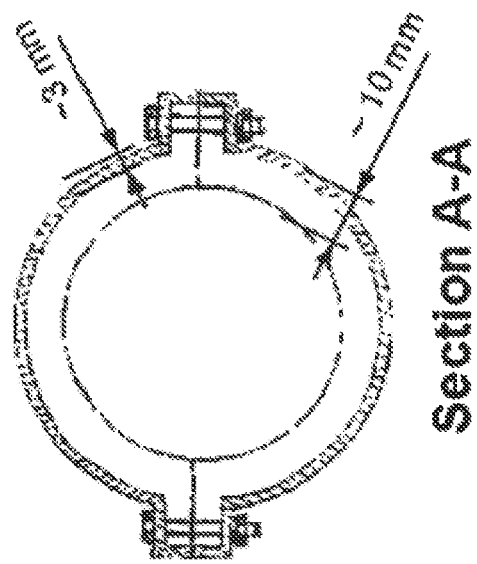

In high performance engines it is advantageous to thermally insulate parts such as spark plugs, exhausts and turbochargers to limit heat losses and improve thermodynamic efficiency. Kits are being marketed which typically used Al-coated fiberglass, as shown in FIGS. 12A and 12B. Aerogels would have an even better performance than fiberglass because of the about 3 times lower thermal conductivity and the about 2 times lower density. A sketch of an exhaust tube insulator is reported in FIGS. 13A and 13B. The hatched regions in FIG. 13A can be reinforced with polymer to allow bonding and/or fastening.

4. Passive Fire Protection of Structural Elements in Buildings.

Fires, even when extinguished rapidly, can cause irreparable damage to the structural elements of buildings. As per ASTM E119 (ASTM E119-12a Standard Test Methods for Fire Tests of Building Construction and Materials, ASTM International) the maximum allowable temperature is 140° C. for structural concrete and 550° C. for structural steel. For concrete, the temperature limit is due to water loss, which is substantial past 120° C. For temperatures in excess of 250° C., CaO recrystallization also ensues. Water loss and recrystallization compromise the structural integrity of concrete and can lead to the condemnation of buildings even after short fires. Steel beams are more resilient than concrete, yet they lose their load-bearing ability between 500 and 600° C., which is well below the melting point of steel. Some types of fire can exceed these temperatures, leading to warping of load-bearing structures in a very short time. A common passive fire-protection strategy is to coat load-bearing components of buildings with thermally insulating materials. The coatings typically are based on plaster, gypsum or vermiculite (see, for example, products by the Schundler Company, Edison, N.Y.). Intumescent coatings are also frequently used which consist of materials which expand 4-5 times when heated and create a porous thermal barrier. A regional manufacturer of this type of products is the Achilles Fire Protection Company, based in Australia (Achilles Fire Protection, Landsdale Wash., Australia). The materials used in passive fire-protection cannot compete with aerogels. Their thermal conductivity is 50-60 times higher than that of aerogels, the density 2-3 times higher, and they are often sacrificial. For example, Morgan Thermal Ceramics (Windsor, Berkshire, UK) produces fire brick insulation with a thermal conductivity of 150 mW/mK and a density of 0.48 g/cm3

Figure 14:
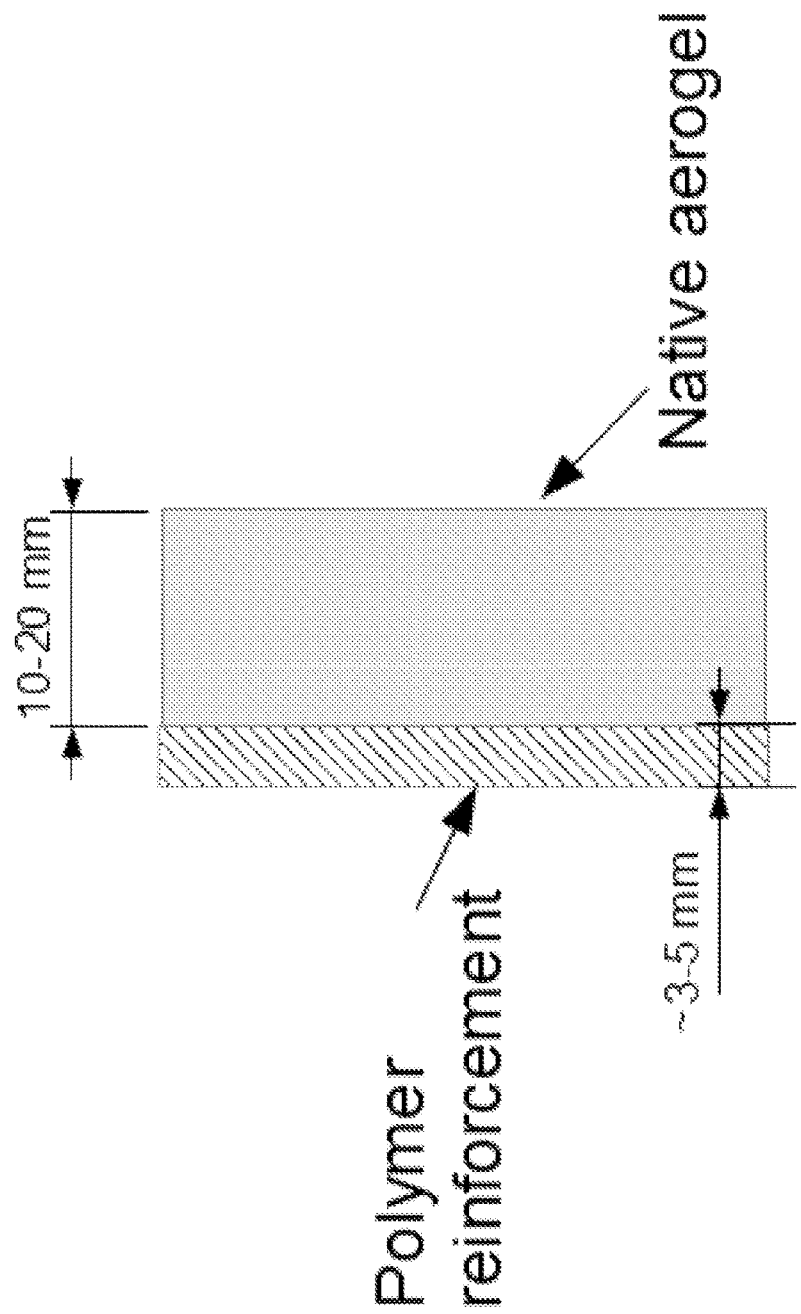
FIG. 14 is a schematic diagram showing proposed aerogel composite for fire protection of structural elements. The polymer-reinforced region can be glued or grouted to the structural element such that the native aerogel may be insulated from high temperatures.

Aerogel bricks reinforced at one edge with polymer, as shown in FIG. 14 can be produced, which could be glued or grouted to a concrete or steel structural element. Since the polymer reinforcement will constitute only a very small fraction of the material, it is anticipated the monoliths to have a density and thermal conductivity close to that of native silica aerogels (2-5 mW/mK, and, respectively, ~0.1 $g/cm^3$).

5. Footwear for Extreme Cold Conditions.

For leisure as well as for military purposes there is the need of lightweight thermal insulation, especially for feet. Aerogels are starting being used for these purposes. For example, Aspen Technologies and Cabot have reported use of aerogel-insulated footwear in high-altitude climbing expeditions. However, the products commercialized by these two companies have distinct disadvantages. Aspen Technologies produces blanket-like materials which have to be wrapped around boots and gloves, and Cabot produces granulates whose thermal conductivity is increased by the free spaces between granules. The disclosed molding technology allows production of form-fitting insulation. For demonstration purposes a custom-molded boot lining reinforced with polymer on the top and bottom edges can be produced as shown in FIGS. 15A and 15B. The native aerogel core can be protected from humidity by contacting the exterior regions with a water-repellent fluorosilane. In this way, the thermal insulation can be part of the inner lining of the boot, saving volume and weight and increasing comfort because of the custom molding.

6. Upscaling.

Figure 16:
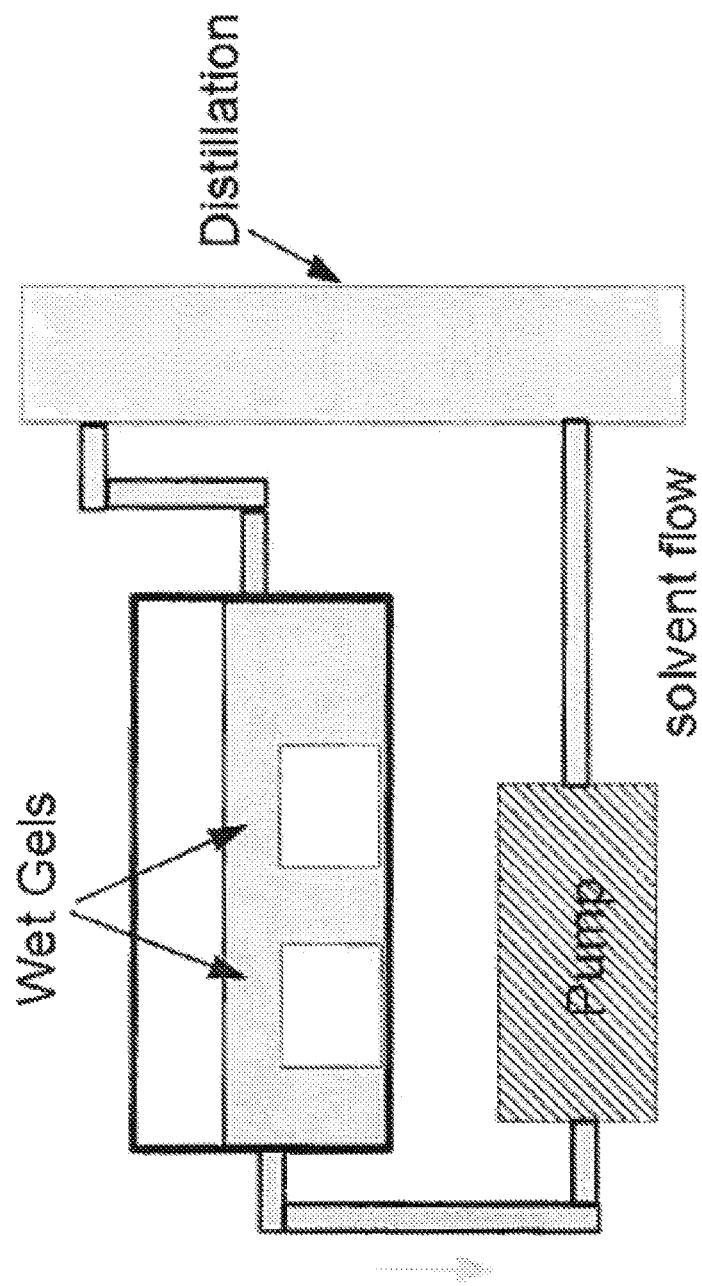
FIG. 16 is a schematic depiction of continuous-flow solvent exchange.

Commercially available release agents which are based on fluorinated hydrocarbons can be used, or thin plastic films such as food wrap as mold liners. These films do not adhere strongly to either wet gels or molds and greatly facilitate gel removal. Tests can be carried out to improve removal of the gels from the molds. After removing from the mold, the gels can be photocross-linked. Intense incandescent lamps can be used for this purpose, and produce complete polymerization after about one hour exposure. Specialized equipment is not necessary, since the planned features are quite large and masking can be achieved using dark paper and tape. After photocrosslinking, the gels can be washed in $H_2O$ to remove unreacted precursors and gelation byproducts. Typically, a fresh solvent diffuses inside wet gels at a rate of about 1 cm every 4 hours (see A. C. Pierre, G. M. Pajonk, Chem. Rev., 2002, 102, 4243). Aerogel components of the invention can have a size of up to 10 cm, which precludes continuous flow operation and imposes batch operation for large scale production. Batches of wet gels can be prepared and water can be pumped through the vessels containing the gels at a constant rate and distilled at the end of the cycle, as shown in FIG. 16. The process can be then repeated with ethanol, once again using closed cycle washings. Water absorbents such as molecular sieves can be added to the ethanol distilling unit to accelerate water removal from the system. The gels can then be placed in an autoclave and dried in supercritical ethanol. Supercritical ethanol is preferable to supercritical $CO_2$ because of the large dimensions of the aerogel components. In supercritical $CO_2$ drying, the solvent of wet gels has to be exchanged with acetone. Then, acetone must be exchanged with liquid $CO_2$. This additional exchange step is not only time-consuming but also hazardous since it requires keeping pressurized vessels below room temperature sometimes for days in a row. Ethanol supercritical drying, instead, can be carried out quite rapidly even in large-volume batches. A pressure vessel (rated to 300° C. and 200 atmospheres) can be purchased with a volume of 4 liters and an inside diameter of 6 inches. This type of vessel is used for ethanol supercritical drying, and a run takes about 3 hours.

The present invention has been described with reference to particular embodiments having various features. In light of the disclosure provided above, it will be apparent to those skilled in the art that various modifications and variations can be made in the practice of the present invention without departing from the scope or spirit of the invention. One skilled in the art will recognize that the disclosed features may be used singularly, in any combination, or omitted based on the requirements and specifications of a given application or design. When an embodiment refers to "comprising" certain features, it is to be understood that the embodiments can alternatively "consist of" or "consist essentially of" any one or more of the features. Other embodiments of the invention will be apparent to those skilled in the art from consideration of the specification and practice of the invention.

It is noted in particular that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the invention fall within the scope of the invention. Further, all of the references cited in this disclosure are each individually incorporated by reference herein in their entireties and as such are intended to provide an efficient way of supplementing the enabling disclosure of this invention as well as provide background detailing the level of ordinary skill in the art.

The invention claimed is:

1. A method for producing an aerogel, comprising:
   providing a first solution comprising an alkoxide;
   providing a second solution comprising a catalyst;
   mixing the first and second solutions to provide a gelation mixture;
   wherein the mixing of the first and second solutions results in formation of a wet gel as a result of hydrolysis of the alkoxide and polymerization of the hydrolyzed alkoxide; and
   after gelation, drying the wet gel in an organic solvent and water azeotrope mixture heated at supercritical temperature and pressure to form an aerogel, wherein the drying is performed with the wet gel outside of any mold.

2. The method of claim 1, wherein the organic solvent is ethanol.

3. The method of claim 1, wherein the method includes no solvent exchange step.

4. The method of claim 1, wherein the wet gel is not dried in liquid or supercritical $CO_2$.

5. The method of claim 1, wherein the alkoxide is tetraethyl orthosilicate (TEOS) or tetramethyl orthosilicate (TMOS).

6. The method of claim 1, wherein the catalyst is an acid, a metal salt or a base.

7. The method of claim 1, wherein the first solution further comprises a first acrylic monomer and the second solution further comprises a second acrylic monomer, wherein the first acrylic monomer is hexanedioldiacryate or acrylated dipentaerthritol and wherein the second acrylic monomer is hexanedioldiacrylate or acrylated dipentaerthritol.

8. The method of claim 7 wherein the first solution or second solution further comprises a photoinitiator.

9. The method of claim 8, wherein photopolymerization is induced by exposure of the gel to a source of visible light at an intensity sufficient to cause photopolymerization.

10. The method of claim 1, wherein the alkoxide is present in an amount ranging from about 0.1% v/v to 50% v/v based on total volume of the gelation mixture.

11. The method of claim 1, wherein the gelation mixture comprises an amine present in an amount ranging from about 0.1% v/v to 20% v/v based on total volume of the gelation mixture.

12. The method of claim 1, wherein the gelation mixture comprises a supercritical organic solvent present in an amount ranging from about 20% v/v to 90% v/v based on total volume of the gelation mixture, and wherein the organic solvent is chosen from one or more of ethanol, methanol, butanol, propanol, acetone, or dimethylsulfoxide.

13. The method of claim 1, wherein the first solution further comprises a first monomer and the second solution further comprises a second monomer.

14. The method of claim 13, wherein the first monomer and/or second monomer are capable of being polymerized by free radical initiation, photoinitiation, and/or thermal initiation.

15. The method of claim 1, wherein the first solution and second solution comprise an ethanol-water azeotrope mixture.

16. The method of claim 2, wherein the first solution and second solution comprise an ethanol-water azeotrope mixture.

* * * * *